(12) United States Patent
Li et al.

(10) Patent No.: US 11,595,168 B2
(45) Date of Patent: Feb. 28, 2023

(54) COMMUNICATION METHOD AND COMMUNICATIONS DEVICE

(71) Applicant: Huawei Technologies Co., Ltd., Shenzhen (CN)

(72) Inventors: Chao Li, Beijing (CN); Shulan Feng, Beijing (CN); Junwei Wang, Beijing (CN); Jingxin Wei, Beijing (CN); Weiwei Fan, Shanghai (CN); Jun Zhu, Shenzhen (CN); Qiong Jia, Shanghai (CN); Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/833,152

(22) Filed: Mar. 27, 2020

(65) Prior Publication Data

US 2020/0228275 A1 Jul. 16, 2020

Related U.S. Application Data

(63) Continuation of application No. PCT/CN2018/109189, filed on Sep. 30, 2018.

(30) Foreign Application Priority Data

Sep. 30, 2017 (CN) .......................... 201710919525.9
Sep. 30, 2017 (CN) .......................... 201710940735.6

(51) Int. Cl.
*H04L 5/00* (2006.01)
*H04W 56/00* (2009.01)
(Continued)

(52) U.S. Cl.
CPC ....... *H04L 5/0048* (2013.01); *H04W 56/0025* (2013.01); *H04W 72/0446* (2013.01); *H04W 72/0453* (2013.01)

(58) Field of Classification Search
CPC . H04L 5/0048; H04L 5/0091; H04L 27/2613; H04L 27/2675; H04L 27/2692;
(Continued)

(56) References Cited

U.S. PATENT DOCUMENTS

2016/0308637 A1 10/2016 Frenne et al.
2018/0219596 A1 8/2018 He et al.
(Continued)

FOREIGN PATENT DOCUMENTS

CN 101060713 A 10/2007
CN 105723639 A 6/2016
(Continued)

OTHER PUBLICATIONS

Guangdong OPPO Mobile Telecom, Remaining details on multiple SS block transmissions in wide band CC. 3GPP TSG RAN WG1 Meeting #90 Prague, Czech Republic, Aug. 21-25, 2017, R1-1713252, 5 pages.
(Continued)

*Primary Examiner* — Dady Chery
(74) *Attorney, Agent, or Firm* — Slater Matsil, LLP

(57) ABSTRACT

A method includes: determining first indication information, where the first indication information indicates a resource location of a second synchronization signal block, and the second synchronization signal block is associated with control information; and sending a first synchronization signal block, where a physical broadcast channel in the first synchronization signal block carries the first indication information.

24 Claims, 18 Drawing Sheets

(51) Int. Cl.
  *H04W 72/0446* (2023.01)
  *H04W 72/0453* (2023.01)
(58) Field of Classification Search
  CPC ... H04L 5/0053; H04L 5/0094; H04L 5/0044; H04J 11/0086; H04J 11/0076; H04J 11/0073; H04J 11/0069; H04W 56/0015; H04W 56/0025; H04W 72/0446; H04W 72/0453; H04W 72/04; H04W 72/042; H04W 48/10; H04W 68/02; H04B 7/0617
  See application file for complete search history.

(56) References Cited

U.S. PATENT DOCUMENTS

| | | | | |
|---|---|---|---|---|
| 2018/0337755 | A1* | 11/2018 | John Wilson | H04W 56/0015 |
| 2019/0124637 | A1 | 4/2019 | Li et al. | |

FOREIGN PATENT DOCUMENTS

| | | |
|---|---|---|
| CN | 106961734 A | 7/2017 |
| CN | 106165470 B | 9/2019 |
| WO | 2017004774 A1 | 1/2017 |
| WO | 2017054207 A1 | 4/2017 |
| WO | 2018213026 | 11/2018 |

OTHER PUBLICATIONS

Huawei, HiSilicon, Detailed design of the contents of System Information, 3GPP TSG-RAN2 Meeting #99bis Prague, Czech Republic, Oct. 9-13, 2017, R2-1710458, 7 pages.
Ericsson. Remaining details on NR-PBCH design, 3GPP TSG RAN WG1 NR Ad-Hoc#3 Nagoya, Japan, Sep. 18-21, 2017, R1-1716150, 5 pages.
Ericsson, Additional synchronization provision. 3GPP TSG RAN WG1 NR Ad-Hoc#3 Nagoya, Japan, Sep. 18-21, 2017, R1-1716158, 6 pages.
Vivo, "Discussion on NR paging design,", 3GPP TSG RAN WG1 NR Ad Hoc #3, R1-1715609, Nagoya, Japan, Sep. 18-21, 2017, total 5 pages.
Guangdong OPPO Mobile Telecom, "Remaining details on SS block transmissions,", 3GPP TSG RAN WG1 Meeting NR#3 R1-1715676, total 3 pages.
LG Electronics, "Consideration on NR-PBCH contents and payload size", 3GPP TSG RAN WG1 Meeting #90, R1-1713123, Prague, Czech Republic, Aug. 21-25, 2017, total 4 pages.
Ericsson, "Summary 6.1.1 Remaining Details on Synchronization signal", 3GPP TSG RAN WG1 NR adhoc#3, R1-1716795, Nagoya, Japan, Sep. 18-21, 2017, total 2 pages.
Ericsson [RAN WG1] "[Draft]Reply LS on multiple SSBs within a wideband carrier", 3GPP TSG RAN WG1 NR Ad-hoc#3, R1-1716835, Nagoya, Japan, Sep. 18-21, 2017, 1 page.
Asbjörn Grovlen "Reply LS on multiple SSBs within a wideband carrier", 3GPP TSG RAN WG1 NR Ad-hoc #3, R1-1716907, Nagoya, Japan, Sep. 18-21, 2017, 1 page.
Huawei, HiSilicon, "Discussion on NR system information delivery", 3GPP TSG RAN WG1 Meeting #89, R1-1708163, Hangzhou, China, May 15-19, 2017, 2 pages.
3GPP TS 38.300 V1.0.1 (Oct. 2017), 3rd Generation Partnership Project; Technical Specification Group Radio Access Metwork; NR; NR and NG-RAN Overall Description; Stage 2 (Release 15), Oct. 2017. total 59 pages.
3GPP TS 38.211 V1.0.0 (Sep. 2017),3rd Generation Partnership Project; Technical Specification Group Radio Access Network; NR; Physical channels and modulation(Release 15), total 37 pages.
3GPP TS 38.213 V1.0.0, 3rd Generation Partnership Project; Technical Specification Group Radio Access Network; NR; Physical layer procedures for control (Release 15), Sep. 2017. total 6 pages.
3GPP TS 38.331 V0.1.0, 3rd Generation Partnership Project; Technical Specification Group Radio Access Network; NR; Radio Resource Control (RRC); Protocol specification (Release 15), Sep. 2017, 154 pages.
Fujitsu: "Discussion on remaining details on SS block and SS burst set design", 3GPP TSG RAN WG1 Meeting #90; R1-1712733, Prague, Aug. 21-25, 2017, 6 pages, Czech Republic.
Qualcomm Incorporated, et al., "PBCH contents and payload size consideration", 3GPP TSG-RAN WG1 Ad-Hoc#2, R1-1711139, Jun. 27-30, 2017, 3 pages, Qingdao, P.R. China.
Qualcomm Incorporated, et al., "Remaining system information delivery consideration", 3GPP TSG-RAN WG1 NR#90, R1-1713376, Aug. 21-25, 2017, 8 pages, Prague, Czech Republic.

* cited by examiner

COMMUNICATION METHOD AND COMMUNICATIONS DEVICE

CROSS-REFERENCE TO RELATED APPLICATIONS

This application is a continuation of International Application No. PCT/CN2018/109189, filed on Sep. 30, 2018, which claims priority to Chinese Patent Application No. 201710919525.9, filed on Sep. 30, 2017 and Chinese Patent Application No. 201710940735.6, filed on Sep. 30, 2017. The disclosures of the aforementioned applications are hereby incorporated by reference in their entireties.

TECHNICAL FIELD

This application relates to the communications field, and more specifically, to a communication method and a communications device

BACKGROUND

In a 5G standardization process being implemented by the 3rd generation partnership project (3GPP), it is considered to support a maximum carrier bandwidth up to 400 MHz. However, for a terminal side, restricted by costs of various types of terminal devices, not all the terminal devices can support operations such as communication and measurement in the bandwidth of 400 MHz. In addition, for system implementation and flexible scheduling, it is agreed in a discussion process of 5G that a network side sends a plurality of synchronization signal blocks (SSB) in a bandwidth of one width, so that a terminal device performs measurement or initial access on different SSBs.

In the plurality of SSBs in the bandwidth, some SSBs are not associated with remaining system information (RMSI). When the terminal device performs initial access, because the terminal device is not provided with any information in advance, the terminal device does not know, before accessing a network, which SSB is associated with the RMSI. Therefore, the terminal device needs to perform synchronization search and system message detection on a frequency channel number of a synchronized frequency of each SSB. When detecting that a current SSB is not associated with the RMSI, the terminal device sequentially performs detection on a next candidate synchronized frequency channel number. Consequently, detection complexity and a delay of network access (e.g., RMSI is successfully detected) of the terminal device are increased.

Therefore, how to effectively reduce detection complexity of a terminal device in a system in which a plurality of SSBs are flexibly configured in one bandwidth becomes a technical problem that urgently needs to be resolved.

SUMMARY

This application provides a communication method and a communications device, to effectively reduce detection complexity of a terminal device.

According to a first aspect, a communication method is provided. The method includes: determining first indication information, where the first indication information indicates a resource location of a second synchronization signal block, and the second synchronization signal block is associated with control information; and sending a first synchronization signal block, where a physical broadcast channel in the first synchronization signal block carries the first indication information.

According to the technical solution in this embodiment of the present invention, a resource location of a synchronization signal block associated with control information is indicated to a receive side, so that a terminal device on the receive side directly learns of the resource location of the synchronization signal block without performing blind detection, and directly switches to perform search at a corresponding resource location. This can reduce detection complexity of the terminal device, and reduce a search and calculation time, power consumption, and a delay of the terminal device.

In some possible implementations, the determining first indication information includes: when the first synchronization signal block is not associated with the control information, determining the first indication information.

In some possible implementations, the method further includes: determining a transmission mode of the first synchronization signal block, where the transmission mode indicates whether the first synchronization signal block is associated with the control information; and the sending a first synchronization signal block includes: sending the first synchronization signal block based on the transmission mode. Whether a synchronization signal block is associated with control information is indicated to a receive side by using a transmission mode of the synchronization signal block, so that a terminal device on the receive side can determine, by detecting the transmission mode of the synchronization signal block, whether the synchronization signal block is associated with the control information, without performing blind detection on a physical broadcast channel. This can reduce detection complexity of the terminal device, and reduce power consumption and a delay of the terminal device.

In some possible implementations, the transmission mode of the first synchronization signal block includes a frequency-domain mapping mode of a synchronization signal sequence in the first synchronization signal block; and the determining a transmission mode of the first synchronization signal block includes: when the first synchronization signal block is associated with the control information, determining that the mapping mode is a first mapping mode of a plurality of predetermined mapping modes; or when the first synchronization signal block is not associated with the control information, determining that the mapping mode is a second mapping mode of the plurality of predetermined mapping modes.

In some possible implementations, the transmission mode of the first synchronization signal block includes a value of an orthogonal cover code that is modulated on a transmission symbol of the first synchronization signal block; and the determining a transmission mode of the first synchronization signal block includes: when the first synchronization signal block is associated with the control information, determining that the value of the orthogonal cover code is a first value of a plurality of predetermined values; and/or when the first synchronization signal block is not associated with the control information, determining that the value of the orthogonal cover code is a second value of the plurality of predetermined values.

In some possible implementations, the transmission mode of the first synchronization signal block includes a range to which a synchronization signal identifier used by the first synchronization signal block belongs; and the determining a transmission mode of the first synchronization signal block includes: when the first synchronization signal block is associated with the control information, determining that the synchronization signal identifier used by the first synchronization signal block belongs to a first subset; and/or when the first synchronization signal block is not associated with the control information, determining that the synchronization signal identifier used by the first synchronization signal block belongs to a second subset.

In some possible implementations, the determining a transmission mode of the first synchronization signal block includes: when the first synchronization signal block is associated with the control information, determining that a synchronization signal identifier used by the first synchronization signal block is a synchronization signal identifier of the first synchronization signal block, and/or when the first synchronization signal block is not associated with the control information, determining that a synchronization signal identifier used by the first synchronization signal block is a sum of a synchronization signal identifier of the first synchronization signal block and a predetermined value; or when the first synchronization signal block is associated with the control information, determining that a synchronization signal identifier used by the first synchronization signal block is a sum of the synchronization signal identifier of the first synchronization signal block and a predetermined value, and/or when the first synchronization signal block is not associated with the control information, determining that a synchronization signal identifier used by the first synchronization signal block is a synchronization signal identifier of the first synchronization signal block, where the predetermined value is greater than a difference between a largest value and a smallest value in a value range of the synchronization signal identifier of the first synchronization signal block.

In some possible implementations, the transmission mode of the first synchronization signal block includes a cyclic redundancy check CRC mask used by the physical broadcast channel in the first synchronization signal block; and the determining a transmission mode of the first synchronization signal block includes: when the first synchronization signal block is associated with the control information, determining that the CRC mask is a first CRC mask of a plurality of predetermined CRC masks; and/or when the first synchronization signal block is not associated with the control information, determining that the CRC mask is a second CRC mask of the plurality of predetermined CRC masks.

In some possible implementations, the transmission mode of the first synchronization signal block includes a scrambling sequence used by the physical broadcast channel in the first synchronization signal block; and the determining a transmission mode of the first synchronization signal block includes: when the first synchronization signal block is associated with the control information, determining that the scrambling sequence is a first scrambling sequence of a plurality of predetermined scrambling sequences; and/or when the first synchronization signal block is not associated with the control information, determining that the scrambling sequence is a second scrambling sequence of the plurality of predetermined scrambling sequences.

Whether a synchronization signal block is associated with control information is implicitly indicated by using the foregoing various transmission modes, so that the terminal device on the receive side can determine, based on a corresponding transmission mode, whether the synchronization signal block is associated with the control information. When the synchronization signal block is not associated with the control information, blind detection that is performed on the physical broadcast channel is not required. This can reduce detection complexity of the terminal device, and reduce power consumption and a delay of the terminal device.

In some possible implementations, the physical broadcast channel further carries second indication information, and the second indication information indicates whether the first synchronization signal block is associated with the control information.

In some possible implementations, the physical broadcast channel further carries third indication information, and the third indication information indicates whether the synchronization signal identifier of the first synchronization signal block is the same as a synchronization signal identifier of the second synchronization signal block.

In some possible implementations, the physical broadcast channel further carries fourth indication information, and the fourth indication information indicates a synchronization signal identifier of the second synchronization signal block.

The synchronization signal identifier of the second synchronization signal block is indicated by using the physical broadcast channel, so that detection complexity of a second device can be further reduced.

According to a second aspect, a communication method is provided. The method includes: receiving a first synchronization signal block; and determining that the first synchronization signal block is not associated with control information, and obtaining first indication information carried on a physical broadcast channel in the first synchronization signal block, where the first indication information indicates a resource location of a second synchronization signal block, and the second synchronization signal block is associated with the control information; and receiving the control information based on the first indication information.

According to the technical solution in this embodiment of the present invention, a resource location of a synchronization signal block associated with control information is indicated to a receive side, so that a terminal device can directly learn of the resource location of the synchronization signal block without performing blind detection, and directly switches to perform search at a corresponding resource location. This can reduce detection complexity of the terminal device, and reduce a search and calculation time, power consumption, and a delay of the terminal device.

In some possible implementations, the method further includes: determining that the first synchronization signal block is associated with the control information, and receiving the control information based on the first synchronization signal block.

In some possible implementations, the transmission mode of the first synchronization signal block indicates whether the first synchronization signal block is associated with the control information, and the method further includes: determining, based on the transmission mode of the first synchronization signal block, whether the first synchronization signal block is associated with the control information.

The terminal device determines, based on the transmission mode of a synchronization signal block, whether the synchronization signal block is associated with control information, without performing blind detection on a physical broadcast channel. This can reduce detection complexity of the terminal device, and reduce power consumption and a delay of the terminal device.

In some possible implementations, the transmission mode of the first synchronization signal block includes a frequency-domain mapping mode of a synchronization signal sequence in the first synchronization signal block; and the determining whether the first synchronization signal block is associated with control information includes: when the mapping mode is a first mapping mode of a plurality of predetermined mapping modes, determining that the first synchronization signal block is associated with the control information; and/or when the mapping mode is a second mapping mode of the plurality of predetermined mapping modes, determining that the first synchronization signal block is not associated with the control information.

In some possible implementations, the transmission mode of the first synchronization signal block includes a value of an orthogonal cover code that is modulated on a transmission symbol of the first synchronization signal block; and the determining whether the first synchronization signal block is associated with control information includes: when the value of the orthogonal cover code is a first value of a plurality of predetermined values, determining that the first synchronization signal block is associated with the control information; and/or when the value of the orthogonal cover code is a second value of the plurality of predetermined values, determining that the first synchronization signal block is not associated with the control information.

In some possible implementations, the transmission mode of the first synchronization signal block includes a range to which a synchronization signal identifier used by the first synchronization signal block belongs; and the determining whether the first synchronization signal block is associated with control information includes: when the synchronization signal identifier used by the first synchronization signal block belongs to a first subset, determining that the first synchronization signal block is associated with the control information; and/or when the synchronization signal identifier used by the first synchronization signal block belongs to a second subset, determining that the first synchronization signal block is not associated with the control information.

In some possible implementations, the transmission mode of the first synchronization signal block includes a cyclic redundancy check CRC mask used by the physical broadcast channel in the first synchronization signal block; and the determining whether the first synchronization signal block is associated with control information includes: when the CRC mask is a first CRC mask of a plurality of predetermined CRC masks, determining that the first synchronization signal block is associated with the control information; and/or when the CRC mask is a second CRC mask of the plurality of predetermined CRC masks, determining that the first synchronization signal block is not associated with the control information.

In some possible implementations, the transmission mode of the first synchronization signal block includes a scrambling sequence used by the physical broadcast channel in the first synchronization signal block; and the determining whether the first synchronization signal block is associated with control information includes: when the scrambling sequence is a first scrambling sequence of a plurality of predetermined scrambling sequences, determining that the first synchronization signal block is associated with the control information; and/or when the scrambling sequence is a second scrambling sequence of the plurality of predetermined scrambling sequences, determining that the first synchronization signal block is not associated with the control information.

The terminal device determines, based on the foregoing corresponding transmission mode, whether the synchronization signal block is associated with the control information. When the synchronization signal block is not associated with the control information, blind detection that is performed on the physical broadcast channel is not required. This can reduce detection complexity of the terminal device, and reduce power consumption and a delay of the terminal device.

In some possible implementations, the physical broadcast channel carries second indication information, and the second indication information indicates whether the first synchronization signal block is associated with the control information. The method further includes: determining, based on the second indication information, whether the first synchronization signal block is associated with the control information.

In some possible implementations, the physical broadcast channel carries third indication information, and the third indication information indicates whether the synchronization signal identifier of the first synchronization signal block is the same as a synchronization signal identifier of the second synchronization signal block; and the method further includes: determining, based on the third indication information, whether the synchronization signal identifier of the first synchronization signal block is the same as the synchronization signal identifier of the second synchronization signal block.

In some possible implementations, the physical broadcast channel further carries fourth indication information, and the fourth indication information indicates a synchronization signal identifier of the second synchronization signal block; and the method further includes: determining, based on the fourth indication information, the synchronization signal identifier of the second synchronization signal block.

Detection complexity of the terminal device can be further reduced by using the fourth indication information.

With reference to any one of the first aspect, the second aspect, or the possible implementations of the first aspect and the second aspect, in some possible implementations, the first indication information is carried in a reserved field of the physical broadcast channel. That the first indication information is carried in the reserved field does not affect another field and makes a comparatively small change on the physical broadcast channel.

In some possible implementations, the physical broadcast channel includes three fields. A first field is valid only when the first synchronization signal block is associated with the control information; a second field is valid only when the first synchronization signal block is not associated with the control information, where the second field carries the first indication information; and a third field is valid both when the first synchronization signal block is associated with and when the first synchronization signal block is not associated with the control information.

In some possible implementations, bits occupied by the first field in the physical broadcast channel partially or completely overlap bits occupied by the second field in the physical broadcast channel.

In the foregoing solution, sufficient information bits can be provided to indicate the resource location of the second synchronization signal block.

In some possible implementations, the resource location is an absolute location of the second synchronization signal block in a bandwidth or a relative location relative to the first synchronization signal block.

In some possible implementations, the first indication information may indicate a frequency offset value between the second synchronization signal block and the first synchronization signal block, or the first indication information may indicate a frequency location of the second synchronization signal block in a PRB on a current carrier.

In some possible implementations, the resource location may include: a time domain location, a frequency domain location, or a time-frequency location.

According to a third aspect, a communication method is provided, including:

determining a transmission mode of a first synchronization signal block, where the transmission mode indicates whether the first synchronization signal block is associated with control information; and sending the first synchronization signal block based on the transmission mode.

According to the technical solution in this embodiment of the present invention, whether a synchronization signal block is associated with control information is indicated to a receive side by using a transmission mode of the synchronization signal block, so that a terminal device on the receive side can determine, by detecting the transmission mode of the synchronization signal block, whether the synchronization signal block is associated with the control information, without performing blind detection on a physical broadcast channel. This can reduce detection complexity of the terminal device, and reduce power consumption and a delay of the terminal device.

In some possible implementations, the transmission mode of the first synchronization signal block includes a frequency-domain mapping mode of a synchronization signal sequence in the first synchronization signal block; and the determining a transmission mode of the first synchronization signal block includes: when the first synchronization signal block is associated with the control information, determining that the mapping mode is a first mapping mode of a plurality of predetermined mapping modes; and/or when the first synchronization signal block is not associated with the control information, determining that the mapping mode is a second mapping mode of the plurality of predetermined mapping modes.

In some possible implementations, the transmission mode of the first synchronization signal block includes a value of an orthogonal cover code that is modulated on a transmission symbol of the first synchronization signal block; and the determining a transmission mode of the first synchronization signal block includes: when the first synchronization signal block is associated with the control information, determining that the value of the orthogonal cover code is a first value of a plurality of predetermined values; and/or when the first synchronization signal block is not associated with the control information, determining that the value of the orthogonal cover code is a second value of the plurality of predetermined values.

In some possible implementations, the transmission mode of the first synchronization signal block includes a range to which a synchronization signal identifier used by the first synchronization signal block belongs; and the determining a transmission mode of the first synchronization signal block includes: when the first synchronization signal block is associated with the control information, determining that the synchronization signal identifier used by the first synchronization signal block belongs to a first subset; and/or when the first synchronization signal block is not associated with the control information, determining that the synchronization signal identifier used by the first synchronization signal block belongs to a second subset.

In some possible implementations, the determining a transmission mode of the first synchronization signal block includes: when the first synchronization signal block is associated with the control information, determining that the synchronization signal identifier used by the first synchronization signal block is a synchronization signal identifier of the first synchronization signal block, and/or when the first synchronization signal block is not associated with the control information, determining that the synchronization signal identifier used by the first synchronization signal block is a sum of a synchronization signal identifier of the first synchronization signal block and a predetermined value; or when the first synchronization signal block is associated with the control information, determining that the synchronization signal identifier used by the first synchronization signal block is a sum of the synchronization signal identifier of the first synchronization signal block and a predetermined value, and/or when the first synchronization signal block is not associated with the control information, determining that the synchronization signal identifier used by the first synchronization signal block is a synchronization signal identifier of the first synchronization signal block, where the predetermined value is greater than a difference between a largest value and a smallest value in a value range of the synchronization signal identifier of the first synchronization signal block.

In some possible implementations, the transmission mode of the first synchronization signal block includes a CRC mask used by the physical broadcast channel in the first synchronization signal block; and the determining a transmission mode of the first synchronization signal block includes: when the first synchronization signal block is associated with the control information, determining that the CRC mask is a first CRC mask of a plurality of predetermined CRC masks; and/or when the first synchronization signal block is not associated with the control information, determining that the CRC mask is a second CRC mask of the plurality of predetermined CRC masks.

In some possible implementations, the transmission mode of the first synchronization signal block includes a scrambling sequence used by the physical broadcast channel in the first synchronization signal block; and the determining a transmission mode of the first synchronization signal block includes: when the first synchronization signal block is associated with the control information, determining that the scrambling sequence is a first scrambling sequence of a plurality of predetermined scrambling sequences; and/or when the first synchronization signal block is not associated with the control information, determining that the scrambling sequence is a second scrambling sequence of the plurality of predetermined scrambling sequences.

Whether a synchronization signal block is associated with control information is implicitly indicated by using the foregoing various transmission modes, so that the terminal device on the receive side can determine, based on a corresponding transmission mode, whether the synchronization signal block is associated with the control information. When the synchronization signal block is not associated with the control information, blind detection that is performed on a physical broadcast channel is not required. This can reduce detection complexity of the terminal device, and reduce power consumption and a delay of the terminal device.

According to a fourth aspect, a communication method is provided, including: receiving a first synchronization signal block; determining, based on a transmission mode of the first synchronization signal block, whether the first synchronization signal block is associated with control information.

According to the technical solution in this embodiment of the present invention, whether a synchronization signal block is associated with control information can be determined by detecting a transmission mode of the synchronization signal block without performing blind detection on a physical broadcast channel. This can reduce detection complexity of a terminal device, and reduce power consumption and a delay of the terminal device.

In some possible implementations, the transmission mode of the first synchronization signal block includes a frequency-domain mapping mode of a synchronization signal sequence in the first synchronization signal block; and the determining whether the first synchronization signal block is associated with control information includes: when the mapping mode is a first mapping mode of a plurality of predetermined mapping modes, determining that the first synchronization signal block is associated with the control information; and/or when the mapping mode is a second mapping mode of the plurality of predetermined mapping modes, determining that the first synchronization signal block is not associated with the control information.

In some possible implementations, the transmission mode of the first synchronization signal block includes a value of an orthogonal cover code that is modulated on a transmission symbol of the first synchronization signal block; and the determining whether the first synchronization signal block is associated with control information includes: when the value of the orthogonal cover code is a first value of a plurality of predetermined values, determining that the first synchronization signal block is associated with the control information; and/or when the value of the orthogonal cover code is a second value of the plurality of predetermined values, determining that the first synchronization signal block is not associated with the control information.

In some possible implementations, the transmission mode of the first synchronization signal block includes a range to which a synchronization signal identifier used by the first synchronization signal block belongs; and the determining whether the first synchronization signal block is associated with control information includes: when the synchronization signal identifier used by the first synchronization signal block belongs to a first subset, determining that the first synchronization signal block is associated with the control information; and/or when the synchronization signal identifier used by the first synchronization signal block belongs to a second subset, determining that the first synchronization signal block is not associated with the control information.

In some possible implementations, the transmission mode of the first synchronization signal block includes a CRC mask used by the physical broadcast channel in the first synchronization signal block; and the determining whether the first synchronization signal block is associated with control information includes: when the CRC mask is a first CRC mask of a plurality of predetermined CRC masks, determining that the first synchronization signal block is associated with the control information; and/or when the CRC mask is a second CRC mask of the plurality of predetermined CRC masks, determining that the first synchronization signal block is not associated with the control information.

In some possible implementations, the transmission mode of the first synchronization signal block includes a scrambling sequence used by the physical broadcast channel in the first synchronization signal block; and the determining whether the first synchronization signal block is associated with control information includes: when the scrambling sequence is a first scrambling sequence of a plurality of predetermined scrambling sequences, determining that the first synchronization signal block is associated with the control information; and/or when the scrambling sequence is a second scrambling sequence of the plurality of predetermined scrambling sequences, determining that the first synchronization signal block is not associated with the control information.

A terminal device determines, based on the foregoing corresponding transmission mode, whether a synchronization signal block is associated with control information. When the synchronization signal block is not associated with the control information, blind detection that is performed on a physical broadcast channel is not required. This can reduce detection complexity of the terminal device, and reduce power consumption and a delay of the terminal device.

In some possible implementations, the method further includes: when the first synchronization signal block is associated with the control information, receiving the control information based on the first synchronization signal block.

With reference to any one of the foregoing aspects or the possible implementations of the foregoing aspects, in some possible implementations, in a cellular scenario and a relay scenario, the control information may be SI such as RMSI or OSI; and in a D2D scenario, the control information may be control information that is used by a transmit end to perform scheduling for a receive end to receive data.

In some possible implementations, in the cellular scenario and the relay scenario, the physical broadcast channel may be a PBCH, and the synchronization signal identifier may be a physical cell identifier; and in the D2D scenario, the physical broadcast channel may be a PSBCH, and the synchronization signal identifier may be a synchronization signal area identifier of a D2D link.

According to a fifth aspect, a communications device is provided, including a processor and a transceiver, so that the method in any one of the foregoing aspects or the possible implementations of the foregoing aspects can be performed.

According to a sixth aspect, a communications device is provided. The communications device has a function of implementing actions of the network device in the foregoing method designs. The function may be implemented by hardware, or may be implemented by hardware executing corresponding software. The hardware or the software includes one or more modules corresponding to the foregoing functions.

In some possible implementations, a structure of the network device includes a processor and a transmitter. The processor is configured to support the network device in performing corresponding functions in the foregoing methods. The transmitter is configured to support communication between the network device and a terminal device, and send information or an instruction in the foregoing method to the terminal device. The network device may further include a memory. The memory is configured to couple to the processor, and the memory stores a program instruction and data that are necessary for the network device.

According to a seventh aspect, a communications device is provided. The communications device has a function of implementing actions of the terminal device in the foregoing method designs. The function may be implemented by hardware, or may be implemented by hardware executing corresponding software. The hardware or the software includes one or more modules corresponding to the foregoing functions.

In some possible implementations, a structure of the terminal device includes a processor and a transmitter. The processor is configured to support the terminal device in performing corresponding functions in the foregoing methods. The transmitter is configured to support communication between the terminal device and a network device or communication between terminal devices, and send information or an instruction in the foregoing methods. The terminal device may further include a memory. The memory is configured to couple to the processor, and the memory stores a program instruction and data that are necessary for the terminal device.

According to an eighth aspect, a computer storage medium is provided. The computer storage medium stores program code, and the program code may be used to instruct to perform the method in any one of the first to the fourth aspects or the possible implementations thereof.

According to a ninth aspect, a computer program product including an instruction is provided. When the computer program product is run on a computer, the computer is enabled to perform the method in any one of the first to the fourth aspects or the possible implementations thereof.

The following embodiment provides a paging message transmission method and apparatus, to improve communication efficiency by reducing a resource occupancy rate of a paging message during downlink sending.

According to a tenth aspect, this application provides a paging message transmission method, including: configuring, by a network device, a frequency domain resource used for transmitting a paging message; and sending, by the network device, paging indication information to a terminal device, where the paging indication information is used to indicate the frequency domain resource used for transmitting the paging message.

In a possible design, the network device sends at least one piece of remaining system information RMSI to the terminal device, and the paging indication information is carried in the at least one piece of RMSI for sending.

In another possible design, the network device sends at least one synchronization signal block SSB to the terminal device, and the paging indication information is carried in the at least one synchronization signal block SSB for sending.

In still another possible design, when the network device configures a plurality of synchronization signal blocks and configures one piece of RMSI, the paging indication information is carried in the piece of RMSI for sending, each of the synchronization signal blocks includes RMSI indication information, and the RMSI indication information is used to indicate a location of the piece of RMSI to the terminal device.

In still another possible design, when the network device configures a plurality of synchronization signal blocks and configures one piece of RMSI, the paging indication information is carried in the first RMSI for sending; the plurality of synchronization signal blocks include one first synchronization signal block that is associated with the first RMSI, the first synchronization signal block includes RMSI indication information, and the RMSI indication information is used to indicate a location of the RMSI to the terminal device; and a synchronization signal block other than the first synchronization signal block in the plurality of synchronization signal blocks is a second synchronization signal block, the second synchronization signal block includes indication information of the first synchronization signal block, and the indication information of the first synchronization signal block is used to indicate a location of the first synchronization signal block relative to the second synchronization signal block.

In still another possible design, when the network device is applied to an unlicensed frequency band, the paging message is carried in a paging frame for sending, and the RMSI further includes one or more of the following parameters: a first time offset value, used to indicate an offset value of the paging frame relative to a start moment of a radio frame transmitted by the network device; a second time interval, used to indicate a maximum time interval for continuously listening to a paging message when the terminal device obtains no paging message through listening in a BWP indicated by the paging indication information; and a length of a paging frame.

According to an eleventh aspect, this application further provides a network device, including: a processor, configured to configure a frequency domain resource used for transmitting a paging message; and a transceiver, configured to send paging indication information to a terminal device, where the paging indication information is used to indicate the frequency domain resource used for transmitting the paging message.

In a possible design, the transceiver is further configured to send at least one piece of remaining system information RMSI to the terminal device, where the paging indication information is carried in the at least one piece of RMSI for sending.

In another possible design, the transceiver is further configured to send at least one synchronization signal block SSB to the terminal device, where the paging indication information is carried in the at least one synchronization signal block SSB for sending.

In still another possible design, when the network device configures a plurality of synchronization signal blocks and configures one piece of RMSI, the paging indication information is carried in the piece of RMSI for sending, each of the synchronization signal blocks includes RMSI indication information, and the RMSI indication information is used to indicate a location of the piece of RMSI to the terminal device.

In still another possible design, when the network device configures a plurality of synchronization signal blocks and configures one piece of RMSI, the paging indication information is carried in the RMSI for sending; and the plurality of synchronization signal blocks include one first synchronization signal block that is associated with the first RMSI, the first synchronization signal block includes RMSI indication information, and the RMSI indication information is used to indicate a location of the RMSI to the terminal device; and a synchronization signal block other than the first synchronization signal block in the plurality of synchronization signal blocks is a second synchronization signal block, the second synchronization signal block includes indication information of the first synchronization signal block, and the indication information of the first synchronization signal block is used to indicate a location of the first synchronization signal block relative to the second synchronization signal block.

In still another possible design, when the network device is applied to an unlicensed frequency band, the paging message is carried in a paging frame for sending, and the RMSI further includes one or more of the following parameters: a first time offset value, used to indicate an offset value of the paging frame relative to a start moment of a radio frame transmitted by the network device; a second time interval, used to indicate a maximum time interval for continuously listening to a paging message when the terminal device obtains no paging message through listening in a BWP indicated by the paging indication information; and a length of a paging frame.

According to a twelfth aspect, this application further provides a paging message transmission method, including: receiving, by a terminal device, paging indication information from a network device; determining, by the terminal device based on the paging indication information, a frequency domain resource used for transmitting a paging message, and receiving the paging message on the frequency domain resource indicated by the paging information.

In a possible design, the terminal device further receives at least one piece of remaining system information RMSI from the network device, where the paging indication information is carried in the at least one piece of RMSI for sending.

In another possible design, the terminal device further receives at least one synchronization signal block SSB from the network device, and the paging indication information is carried in the at least one synchronization signal block SSB for sending.

In still another possible design, when the network device configures a plurality of synchronization signal blocks and configures one piece of RMSI, the paging indication information is carried in the piece of RMSI for sending, each of the synchronization signal blocks includes RMSI indication information, and the RMSI indication information is used to indicate a location of the piece of RMSI to the terminal device.

In still another possible design, when the network device configures a plurality of synchronization signal blocks and configures one piece of RMSI, the paging indication information is carried in the first RMSI for sending; the plurality of synchronization signal blocks include one first synchronization signal block that is associated with the first RMSI, the first synchronization signal block includes RMSI indication information, and the RMSI indication information is used to indicate a location of the RMSI to the terminal device; and a synchronization signal block other than the first synchronization signal block in the plurality of synchronization signal blocks is a second synchronization signal block, the second synchronization signal block includes indication information of the first synchronization signal block, and the indication information of the first synchronization signal block is used to indicate a location of the first synchronization signal block relative to the second synchronization signal block.

In still another possible design, when the terminal device is applied to an unlicensed frequency band, the terminal device determines a location of the paging message frame based on the paging indication information, and the paging indication information includes one or more of the following parameters: a first time offset value, used to indicate an offset value of the paging frame relative to a start moment of a radio frame transmitted by the network device; a second time interval, used to indicate a maximum time interval for continuously listening to a paging message when the terminal device obtains no paging message through listening in a BWP indicated by the paging indication information; and a length of a paging frame.

In still another possible design, when the network device configures to send the paging message in a plurality of BWPs, the terminal device starts to receive, based on the first time offset value, the paging message from a BWP with a minimum first time offset value.

In still another possible design, if the terminal device receives no paging message within the second time interval, the terminal device jumps to a next BWP, where the next BWP has a minimum first time offset value in remaining BWPs.

According to a thirteenth aspect, this application provides a terminal device, including: a transceiver, configured to receive paging indication information from a network device; and a processor, configured to determine, based on the paging indication information, a frequency domain resource used for transmitting a paging message, and receive the paging message on the frequency domain resource indicated by the paging information.

In another possible design, when the terminal device is applied to an unlicensed frequency band, the processor determines a location of the paging message frame based on the paging indication information, and the paging indication information includes one or more of the following parameters: a first time offset value, used to indicate an offset value of the paging frame relative to a start moment of a radio frame transmitted by the network device; a second time interval, used to indicate a maximum time interval for continuously listening to a paging message when the terminal device obtains no paging message through listening in a BWP indicated by the paging indication information; and a length of a paging frame.

In still another possible design, when the network device configures to send the paging message in a plurality of BWPs, the processor starts to receive, based on the first time offset value, the paging message from a BWP with a minimum first time offset value.

In still another possible design, if the terminal device receives no paging message within the second time interval, the terminal device jumps to a next BWP, where the next BWP has a minimum first time offset value in remaining BWPs.

According to a fourteenth aspect, this application provides a computer readable storage medium, and the computer readable storage medium stores an instruction. When the instruction is run on a computer, the computer is enabled to perform the methods in the foregoing aspects.

According to a fifteenth aspect, this application provides a computer program product including an instruction. When the computer program product is run on a computer, the computer is enabled to perform the methods in the foregoing aspects.

DETAILED DESCRIPTION OF ILLUSTRATIVE EMBODIMENTS

The following describes the technical solutions of this application with reference to the accompanying drawings.

Figure 1:
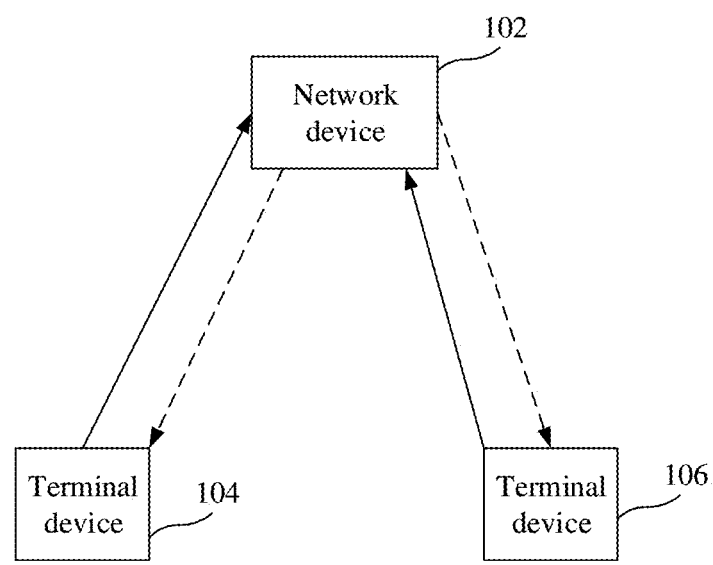
FIG. 1 is a schematic diagram of a system to which an embodiment of the present invention is applied.

FIG. 1 is a schematic diagram of a system to which an embodiment of the present invention is applied. As shown in FIG. 1, a system 100 may include a network device 102 and terminal devices 104 and 106. The network device and the terminal device are wirelessly connected. It should be understood that FIG. 1 shows an example in which the system includes only one network device for description. However, the embodiments of the present invention are not limited thereto. For example, the system may further include more network devices. Similarly, the system may also include more terminal devices. It should be further understood that the system may also be referred to as a network. This is not limited in the embodiments of the present invention.

Figure 2:
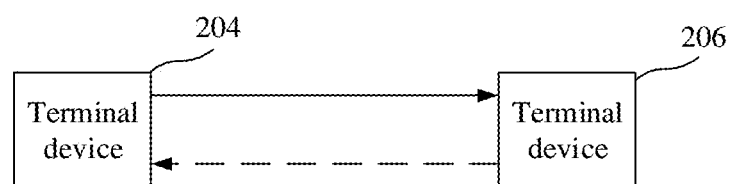
FIG. 2 is a schematic diagram of another system to which an embodiment of the present invention is applied.

FIG. 2 is a schematic diagram of another system to which an embodiment of the present invention is applied. As shown in FIG. 2, the system 200 may include terminal devices 204 and 206, and the terminal devices are connected to each other through a device-to-device (D2D) link. It should be understood that FIG. 2 shows an example in which the system includes only two terminal devices for description. However, the embodiments of the present invention are not limited thereto. For example, the system may further include more terminal devices.

A communications device in the embodiments of the present invention may be a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN), or the like.

By way of example but not limitation, in the embodiments of the present invention, the terminal device may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on the body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement complete or partial functions without depending on smartphones, such as smartwatches or smart glasses, and devices that focus on one type of application function and need to work with other devices such as smartphones, such as various smart bands or smart jewelry for monitoring physical signs.

A communications device in the embodiments of the present invention may be a network device. The network device may be a device configured to communicate with the terminal device. The network device may be a base transceiver station (BTS) in a global system for mobile communications (GSM) or code division multiple access (CDMA), may be a NodeB (NB) in a wideband code division multiple access (WCDMA) system, may be an evolved NodeB (eNB or eNodeB) in a long term evolution (LTE) system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like.

In addition, in the embodiments of the present invention, the network device serves a cell, and the terminal device communicates with the network device by using a transmission resource (for example, a frequency domain resource or a spectrum resource) used by the cell. The cell may be a cell corresponding to the network device (for example, a base station), and the cell may belong to a macro base station, or may belong to a base station corresponding to a small cell (small cell). The small cell herein may include a metro cell, a micro cell, a pico cell, a femto cell (Femto cell), and the like. These small cells have characteristics of a small coverage area and a low transmit power, and are applicable to providing a high-rate data transmission service. In addition, the cell may alternatively be a hypercell.

Figure 3:
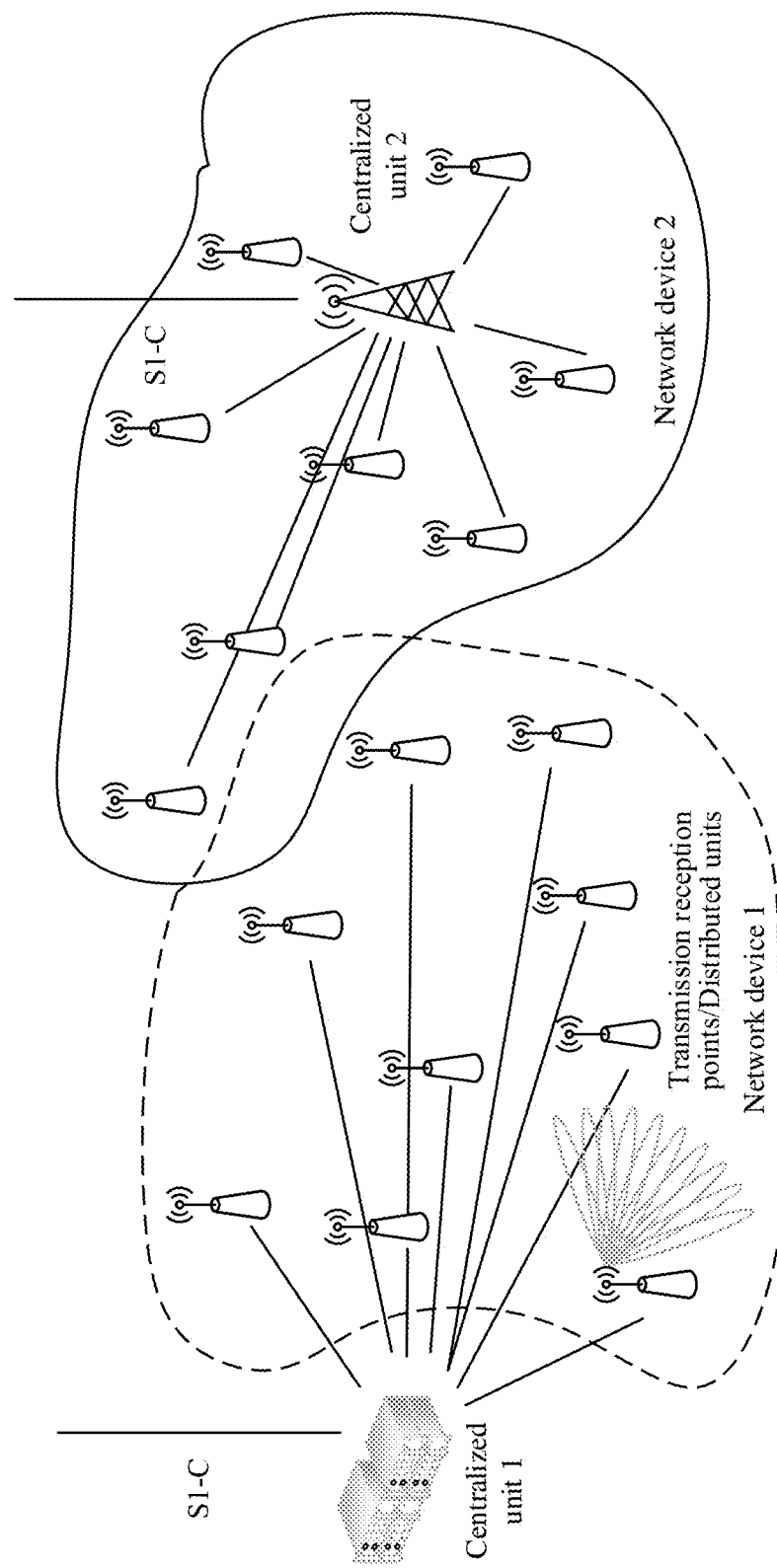
FIG. 3 is a schematic diagram of a network architecture according to an embodiment of the present invention.

FIG. 3 is a schematic diagram of an example of a network architecture to which an embodiment of the present invention may be applied. The schematic diagram of the network architecture may be an architectural diagram of a new radio access (NR) network in a next-generation wireless communications system. In the schematic diagram of the network architecture, a network device may be divided into one centralized unit (CU) and a plurality of transmission reception points (TRP)/distributed units (DU). In other words, a bandwidth based unit (BBU) of the network device is reconstructed as a DU functional entity and a CU functional entity. It should be noted that forms and quantities of the centralized units and the TRPs/DUs constitute no limitation on the embodiments of the present invention. Although the network device 1 and the network device 2 shown in FIG. 3 respectively correspond to different forms of centralized units, functions of the network device 1 and the network device 2 are not affected. It can be understood that a centralized unit 1 and TRPs/DUs in a dashed-line range are components of the network device 1, a centralized unit 2 and TRPs/DUs in a solid-line range are components of the network device 2, and the network device 1 and the network device 2 are network devices (or referred to as base stations) in an NR system.

The CU may process a wireless higher layer protocol stack function, such as a radio resource control (RRC) layer or a packet data convergence protocol (PDCP) layer, and even can support movement of some core network functions to an access network, where the network is referred to as an edge computing network. Therefore, higher network latency requirements of a future communications network for emerging services such as video, online shopping, and virtual/augmented reality are met.

The DU may mainly process a physical layer function and a layer 2 function with a comparatively high real-time requirement. In consideration of a radio remote unit (RRU) and a transmission resource of the DU, some physical layer functions of the DU may be moved up to the RRU. With miniaturization of the RRU, even more radically, the DU and the RRU may be combined together.

CUs may be deployed in a centralized manner. Deployment of DUs depends on an actual network environment. In a core urban area with relatively high traffic density and relatively small station spacing, in an area with limited computer room resources, such as a university or a large-scale performance venue, DUs may also be deployed in a centralized manner. However, in an area with relatively sparse traffic and relatively large station spacing and the like, such as a suburban county or a mountainous area, DUs may be deployed in a distributed manner.

An example interface S1-C shown in FIG. 3 may be a standard interface between a network device and a core network, and a specific device connected to the interface S1-C is not shown in FIG. 3.

Figure 4:
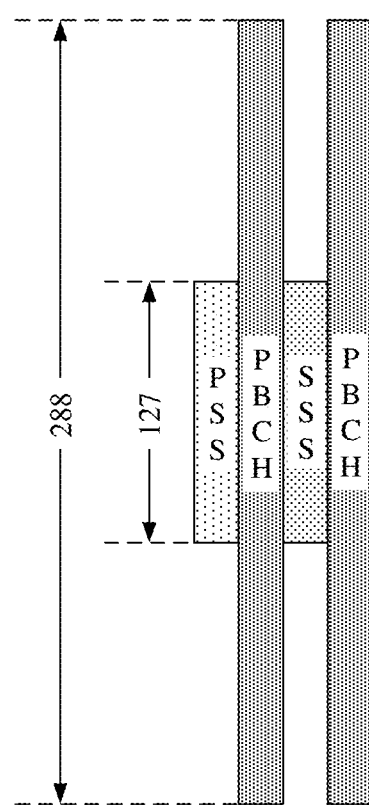
FIG. 4 is a schematic structural diagram of a synchronization signal block according to an embodiment of the present invention.

FIG. 4 is a schematic structural diagram of a synchronization signal block according to an embodiment of the present invention. It should be understood that FIG. 4 is merely an example and constitutes no limitation on the embodiments of the present invention.

As shown in FIG. 4, synchronization signals include a primary synchronization signal (primary synchronization signal, PSS) and a secondary synchronization signal (secondary synchronization signal, SSS), and may constitute one SSB together with a physical broadcast channel (Physical Broadcast Channel, PBCH). In other words, an NR primary synchronization signal (NR-PSS), an NR secondary synchronization signal (NR-SSS), and an NR physical broadcast channel (NR-PBCH) are sent in one SSB. For brevity, the NR-PSS, the NR-SSS, and the NR-PBCH in a synchronization signal block may be respectively referred to as a PSS, an SSS, and a PBCH briefly.

In addition, a plurality of SSBs may constitute one synchronization signal burst set, and the SS burst set is sent periodically. In other words, a network device sends SS blocks by periodically sending an SS burst set, and each SS burst set includes a plurality of SSBs.

For example, FIG. 4 is a schematic diagram of a possible structure of a synchronization signal block. A PSS and an SSS are mainly used to help UE identify a cell and synchronize with the cell. A PBCH includes most basic system information such as a system frame number or intra-frame timing information. The UE cannot access the cell unless the UE successfully receives a synchronization signal block. Each SSB spans across four symbols, where a PSS occupies the first symbol; a PBCH occupies the second symbol; a PBCH, an SSS, and a PBCH occupy the third symbol; and a PBCH occupies the fourth symbol.

Remaining minimum system information (remaining minimum system information, RMSI) is carried on a physical downlink shared channel (PDSCH), and the PDSCH carrying the RMSI is scheduled by using a physical downlink control channel (PDCCH) carrying RMSI scheduling information. The PBCH in the SSB includes some basic information for finding the PDCCH carrying the RMSI scheduling information. To facilitate blind detection performed by the terminal on the PDCCH carrying the RMSI scheduling, the PBCH in the SSB needs to provide some information of search space (Type0-PDCCH common search space) of the PDCCH carrying the RMSI scheduling information.

It should be understood that names of the synchronization signal block and the synchronization signal burst set are not limited in the embodiments of the present invention. In other words, the synchronization signal block and the synchronization signal burst set may be expressed as other names. For example, the SSB may also be expressed as an SS/PBCH block.

Figure 5:
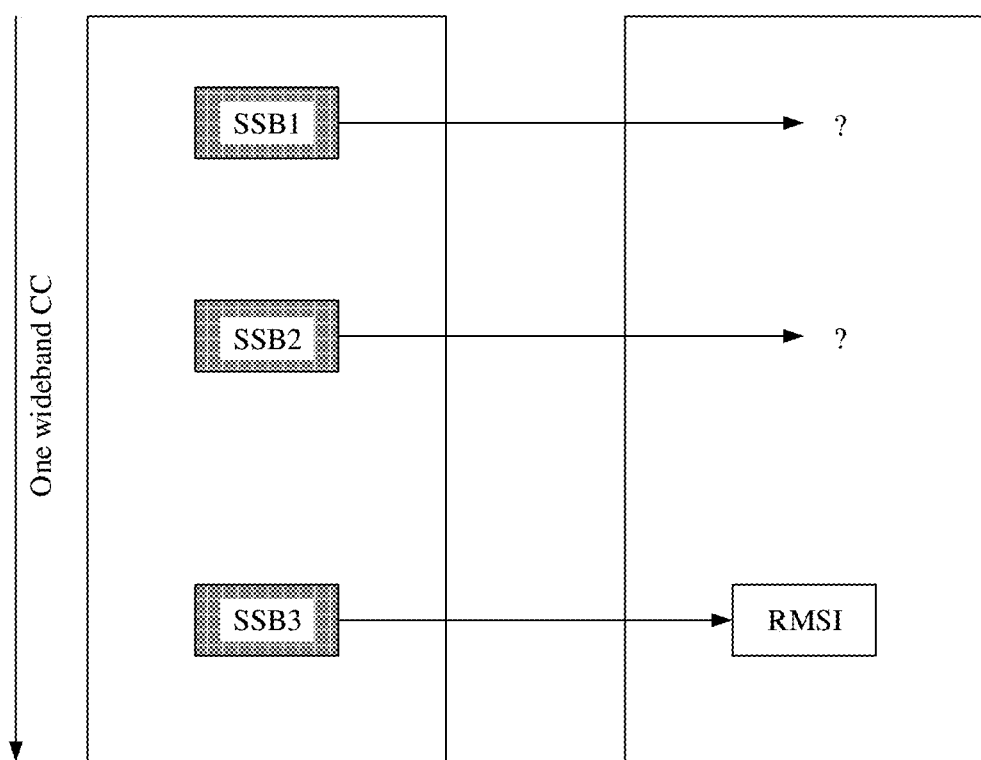
FIG. 5 is a schematic diagram in which a plurality of SSBs are configured in one bandwidth according to an embodiment of the present invention.

FIG. 5 is a schematic diagram in which a plurality of SSBs are configured in one bandwidth. It should be understood that FIG. 5 is merely an example and constitutes no limitation on the embodiments of the present invention.

As shown in FIG. 5, in three SSBs in one bandwidth, an SSB3 is associated with RMSI, and an SSB1 and an SSB2 are not associated with RMSI. When no information is provided, the terminal device needs to separately perform synchronization search and RMSI detection on frequency channel numbers of synchronized frequencies of the SSB1, the SSB2, and the SSB3. When detecting that a current SSB is associated with no RMSI, the terminal device sequentially detects a next candidate synchronized frequency channel number. Consequently, detection complexity and a delay of network access of the terminal device are greatly increased.

In view of this, the embodiments of the present invention provide a technical solution, to reduce blind detection for the terminal device, reduce detection complexity for the terminal device, and reduce power consumption and a delay for the terminal device.

It should be understood that RMSI may also be replaced with other control information. In addition, the technical solution in the embodiments of the present invention may be applied not only to a cellular scenario and a relay scenario, but also to a D2D scenario. Control information is used as an example for description in the embodiments of the present invention. In the cellular scenario and the relay scenario, the control information may be system information (SI) such as RMSI, or other system information (OSI). In the D2D scenario, the control information is control information used by a transmit end to schedule for a receive end to receive data. However, this is not limited in the embodiments of the present invention.

It should be further understood that, in the cellular scenario and the relay scenario, a physical broadcast channel in the embodiments of the present invention may be a PBCH, and a synchronization signal identifier may be a physical cell identifier. In the D2D scenario, the physical broadcast channel in the embodiments of the present invention may be a physical secondary sidelink broadcast channel (PSBCH), and the synchronization signal identifier may be a D2D link synchronization signal identifier. However, this is not limited in the embodiments of the present invention.

It should be further understood that an association between an SSB and control information may include but is not limited to the following manners:

Manner 1: The association indicates that there is control information being sent on a time domain resource the same as that of an SSB or on a time domain resource subsequent to the SSB in a protocol-specified manner or in a predefined manner. There is a time correspondence between the subsequent time domain resource and the SSB. For example, the subsequent time domain resource is adjacent to the SSB, or is spaced with the SSB specific duration apart.

Manner 2: The association is that resource configuration information of control information that is associated with the terminal device is indicated by using a physical broadcast channel in an SSB. For example, the resource configuration information is a location of a resource pool of the control information or a configuration of indication information of the control information.

Figure 6:
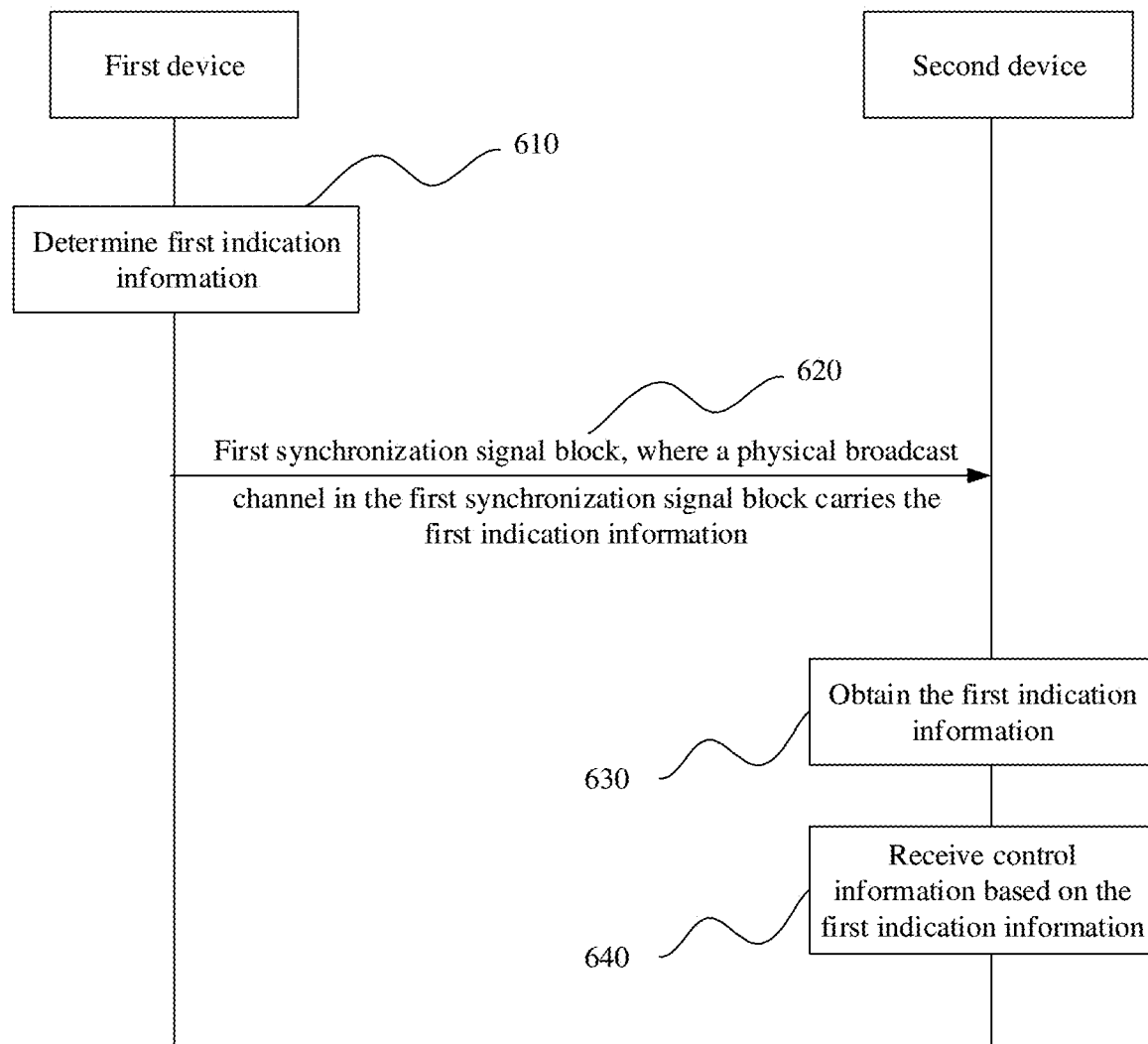
FIG. 6 is a schematic flowchart of a communication method according to an embodiment of the present invention.

FIG. 6 is a schematic flowchart of a communication method according to an embodiment of the present invention. In FIG. 6, a first device is a sending device, for example, the network device or the terminal device described above; and a second device is a receiving device, for example, the terminal device described above.

610. The first device determines first indication information, where the first indication information indicates a resource location of a second synchronization signal block, and the second synchronization signal block is associated with control information.

In this embodiment of the present invention, when sending a synchronization signal block (referred to as a first synchronization signal block), the first device determines a resource location of a synchronization signal block (referred to as the second synchronization signal block) associated with control information, then indicates, to the second device, the resource location of the second synchronization signal block in the first synchronization signal block.

It should be understood that the resource location may include: a time domain location, a frequency domain location, or a time-frequency location. For example, when the first indication information indicates the time domain location, it indicates that the second synchronization signal block and the first synchronization signal block may not be in a same slot. The following uses the frequency domain location as an example for description. However, this is not limited in this embodiment of the present invention.

Optionally, the resource location of the second synchronization signal block may be an absolute location of the second synchronization signal block in a bandwidth or a relative location relative to the first synchronization signal block.

For example, the first indication information may indicate a frequency offset value between the second synchronization signal block and the first synchronization signal block, or the first indication information may indicate a frequency location of the second synchronization signal block in a physical resource block (PRB) on a current carrier.

It should be understood that the second synchronization signal block may be the same as the first synchronization signal block, and this case is a case in which the first synchronization signal block is associated with the control information. Correspondingly, in this case, a relative deviation value of a time domain resource or a frequency domain resource indicated by the first indication information is 0, or an indicated absolute location in the bandwidth is a location of the first synchronization signal block.

Optionally, when the first synchronization signal block is not associated with the control information, the first device may determine the first indication information.

In other words, when the first synchronization signal block is associated with the control information, the first indication information may not be required. When the first synchronization signal block is not associated with the control information, the first device configures the first indication information.

620. The first device sends the first synchronization signal block, where a physical broadcast channel in the first synchronization signal block carries the first indication information.

The first device adds the first indication information to the physical broadcast channel in the first synchronization signal block, and sends the first indication information to the second device.

Optionally, in an embodiment of the present invention, the first indication information may be carried in a reserved field of the physical broadcast channel.

That the first indication information is carried in the reserved field does not affect another field and makes a comparatively small change on the physical broadcast channel.

Optionally, in an embodiment of the present invention, the physical broadcast channel may be reset. For example, the physical broadcast channel may include three fields, where a first field is valid only when the first synchronization signal block is associated with the control information; a second field is valid only when the first synchronization signal block is not associated with the control information, and the second field carries the first indication information; and a third field is valid when the first synchronization signal block is associated with or when the first synchronization signal block is not associated with the control information.

Optionally, bits occupied by the first field in the physical broadcast channel partially or completely overlap bits occupied by the second field in the physical broadcast channel.

Figure 7:
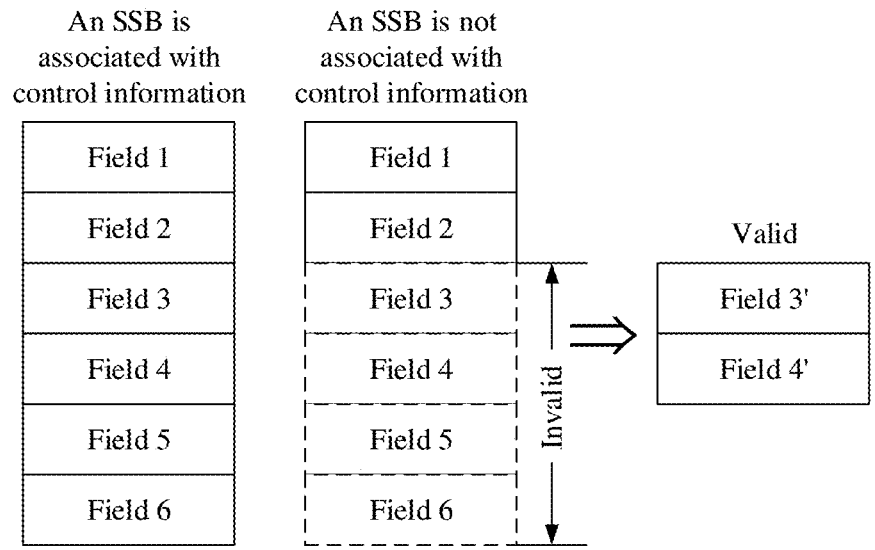
FIG. 7 is a schematic diagram of a physical broadcast channel according to an embodiment of the present invention.

For example, as shown in FIG. 7, a field 1 and a field 2 are valid when an SSB is associated with or not associated with control information, and are the third fields. A field 3 to a field 6 are valid when an SSB is associated with control information, and are the first fields. A field 3' and a field 4' are valid when an SSB is not associated with control information, and are the second fields. The first indication information may be carried in the field 3' and the field 4'.

In other words, when a current SSB is not associated with control information, except for some fields that need to be used during some measurement, other fields in the physical broadcast channel field become invalid. After the other fields are invalid, remaining bits may be reconfigured as a new field, to carry the first indication information.

A PBCH is used as an example. When an SSB is not associated with control information, except for a hyper frame number (HFN) and an SSB time index, other original fields such as fields "RMSI control resource", "subcarrier offset value of a synchronization signal in a PRB", and "system frame number (SFN)" on the PBCH are invalid. PBCH bits corresponding to the invalid fields may be used to carry the first indication information.

In the foregoing solution, sufficient information bits can be provided to indicate the resource location of the second synchronization signal block.

For an 8192-point fast fourier transform (Fast Fourier Transformation, FFT) orthogonal frequency division multiplexing (orthogonal frequency division multiplexing, OFDM) system, assuming that one PRB occupies 12 subcarriers, there are a maximum of 8192/12=682 PRBs. The 682 PRBs use a maximum of 10 bits (indicating a maximum of 1024 values) to indicate PRB frequency locations of all SSBs associated with RMSI.

Optionally, in an embodiment of the present invention, the physical broadcast channel further carries third indication information, and the third indication information indicates whether a synchronization signal identifier of the first synchronization signal block is the same as a synchronization signal identifier of the second synchronization signal block.

Specifically, in some possible designs, the synchronization signal identifier of the first synchronization signal block may be different from the synchronization signal identifier of the second synchronization signal block. In this case, the third indication information may be carried on the physical broadcast channel to indicate whether the synchronization signal identifier of the first synchronization signal block is the same as the synchronization signal identifier of the second synchronization signal block.

Optionally, in an embodiment of the present invention, the physical broadcast channel further carries fourth indication information, and the fourth indication information indicates a synchronization signal identifier of the second synchronization signal block.

Specifically, in addition to indicating the resource location of the second synchronization signal block, the fourth indication information may be further carried on the physical broadcast channel to indicate the synchronization signal identifier of the second synchronization signal block. For example, when the synchronization signal identifier of the first synchronization signal block is different from the synchronization signal identifier of the second synchronization signal block, the synchronization signal identifier of the second synchronization signal block is indicated by using the physical broadcast channel, so that detection complexity of the second device can be further reduced.

According to the foregoing technical solution, after detecting the first synchronization signal block, the second device may directly learn of the resource location of the second synchronization signal block, so that the second device may directly switch to the corresponding resource location for searching without performing blind detection. This reduces detection complexity of the second device, and reduces a search calculation time, power consumption, and a delay of the second device.

Optionally, the first device may further indicate, to the second device, whether the first synchronization signal block is associated with the control information.

The first device indicates, to the second device, whether the first synchronization signal block is associated with the control information, in an explicit manner, for example, by using a corresponding bit, or in an implicit manner, for example, by using a transmission mode of the first synchronization signal block. Descriptions are separately provided below.

Optionally, in an embodiment of the present invention, the physical broadcast channel further carries second indication information, and the second indication information indicates whether the first synchronization signal block is associated with the control information.

This embodiment uses an explicit indication manner. For example, the second indication information may be carried by using one bit on the physical broadcast channel, to indicate whether the first synchronization signal block is associated with the control information.

Optionally, in an embodiment of the present invention, the first device may further determine a transmission mode of the first synchronization signal block, where the transmission mode indicates whether the first synchronization signal block is associated with the control information; and send the first synchronization signal block based on the transmission mode.

This embodiment uses an implicit indication manner. The first device separately indicates, by using different transmission modes of the first synchronization signal block, that the first synchronization signal block is associated with the control information or that the first synchronization signal block is not associated with the control information.

Figure 8:
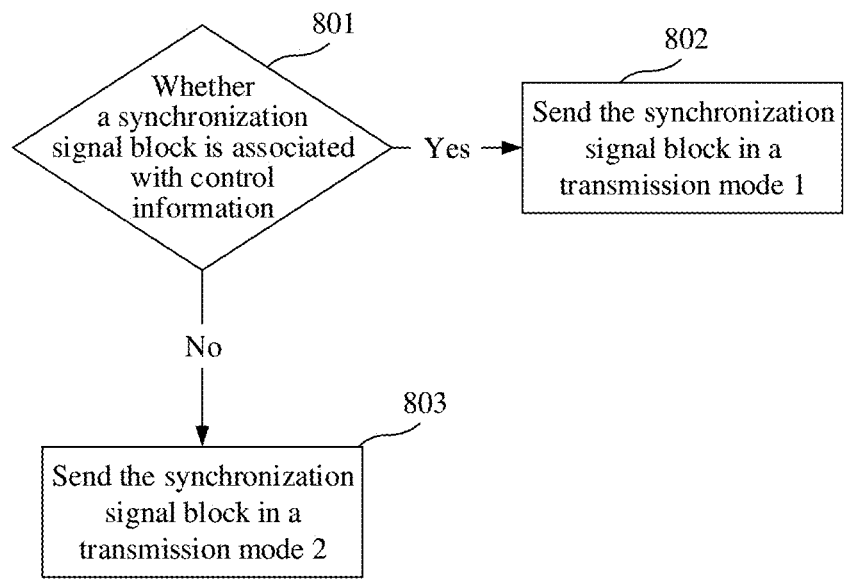
FIG. 8 is a schematic flowchart of a communication method according to another embodiment of the present invention.

For example, the first device may perform a procedure shown in FIG. 8. In 801, the first device determines whether a synchronization signal block is associated with control information. If yes, the first device performs 802, and sends the synchronization signal block in a transmission mode 1; or if no, the first device performs 803, and sends the synchronization signal block in a transmission mode 2.

Optionally, the transmission mode may include a frequency-domain mapping mode of a synchronization signal sequence, an orthogonal cover code (OCC), a synchronization signal identifier, a cyclic redundancy check (CRC) mask of a physical broadcast channel, scrambling of a physical broadcast channel, or the like. Descriptions are separately provided below, but this is not limited in this embodiment of the present invention.

Optionally, in an embodiment of the present invention, the transmission mode of the first synchronization signal block includes a frequency-domain mapping mode of a synchronization signal sequence in the first synchronization signal block; and the first device may: when the first synchronization signal block is associated with the control information, determine that the mapping mode is a first mapping mode of a plurality of predetermined mapping modes; and/or when the first synchronization signal block is not associated with the control information, determine that the mapping mode is a second mapping mode of the plurality of predetermined mapping modes.

Specifically, the first device may determine, based on whether the first synchronization signal block is associated with the control information, the frequency-domain mapping mode of the synchronization signal sequence in the first synchronization signal block, and use different mapping modes for association or non-association.

Figure 9:
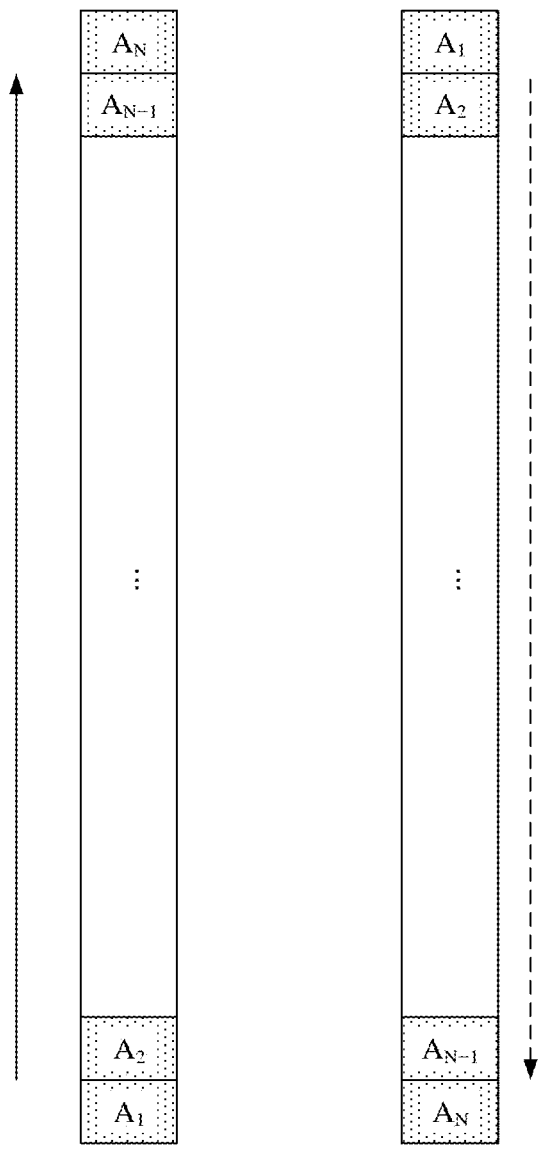
FIG. 9 is a schematic diagram of a mapping mode according to an embodiment of the present invention.

For example, two mapping modes shown in FIG. 9 are used for an SSS sequence or a PSS sequence. For the SSS sequence or the PSS sequence, mapping from a low frequency to a high frequency is a mapping mode, and this may correspond to a case in which an SSB is associated with control information. For the SSS sequence or the PSS sequence, mapping from a high frequency to a low frequency is another mapping mode, and this may correspond to a case in which an SSB is not associated with control information. This is not limited.

Optionally, in an embodiment of the present invention, the transmission mode of the first synchronization signal block includes a value of an orthogonal cover code that is modulated on a transmission symbol of the first synchronization signal block; and the first device may: when the first synchronization signal block is associated with the control information, determine that the value of the orthogonal cover code is a first value of a plurality of predetermined values; and/or when the first synchronization signal block is not associated with the control information, determine that the value of the orthogonal cover code is a second value of the plurality of predetermined values.

Specifically, the first device may determine, based on whether the first synchronization signal block is associated with the control information, the value of the orthogonal cover code that is modulated on the transmission symbol of the first synchronization signal block. Different values of the orthogonal cover code are used for association or non-association.

Figure 10:
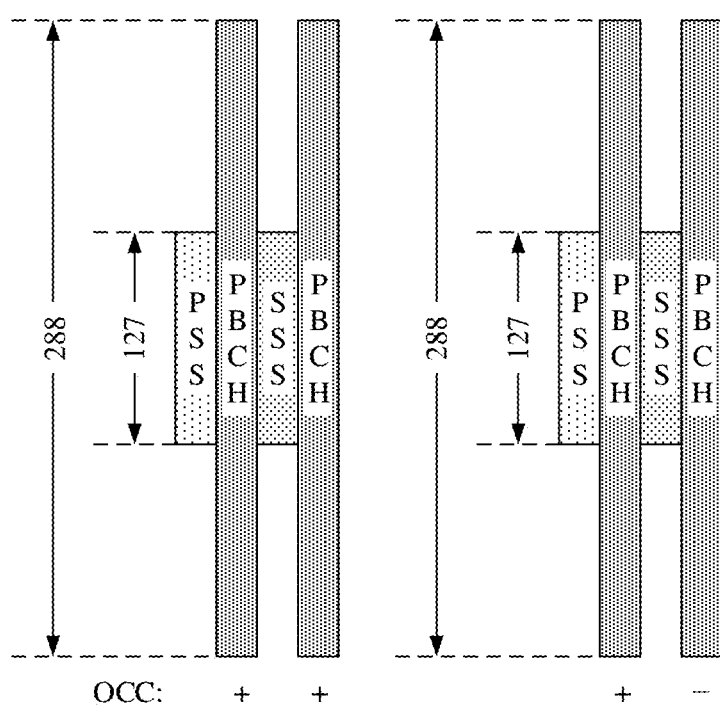
FIG. 10 and FIG. 11 are schematic diagrams of an OCC according to an embodiment of the present invention.
Figure 11:
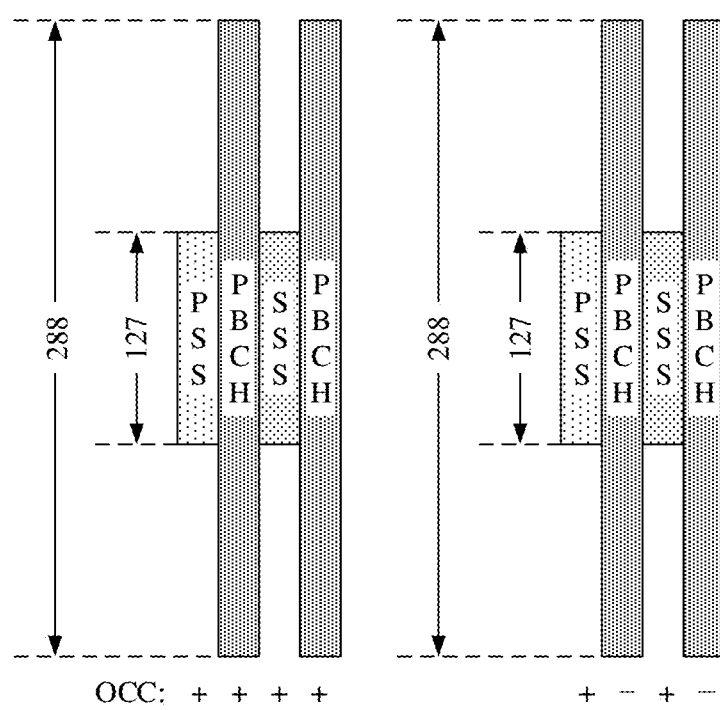

For example, different values of an orthogonal cover code shown in FIG. 10 may be used to indicate that the first synchronization signal block is associated with the control information or the first synchronization signal block is not associated with the control information. Alternatively, different values of an orthogonal cover code shown in FIG. 11 may be used to indicate that the first synchronization signal block is associated with the control information or the first synchronization signal block is not associated with the control information. In FIG. 10, an OCC is modulated on two PBCH symbols. In FIG. 11, an OCC is modulated on four symbols: a PSS, a PBCH, an SSS, and a PBCH. "+" indicates that data or symbols on all subcarriers are multiplied by +1, and "−" indicates that data or symbols on all subcarriers are multiplied by "−1".

Optionally, in an embodiment of the present invention, the transmission mode of the first synchronization signal block includes a range to which a synchronization signal identifier used by the first synchronization signal block belongs; and the first device may: when the first synchronization signal block is associated with the control information, determine that the synchronization signal identifier used by the first synchronization signal block belongs to a first subset; and/or when the first synchronization signal block is not associated with the control information, determine that the synchronization signal identifier used by the first synchronization signal block belongs to a second subset.

Specifically, in this embodiment, synchronization signal identifiers in two subsets may be set, to respectively correspond to cases in which control information is associated or in which control information is not associated. For example, the first subset may be a set of synchronization signal identifiers (that is, actual synchronization signal identifiers) of synchronization signal blocks, and the second subset may be a set of synchronization signal identifiers obtained by adding a predetermined value to the synchronization signal identifiers in the first subset. The predetermined value is greater than a difference between a largest value and a smallest value in the first subset.

For example, if a set of the actual synchronization signal identifiers is {0-503}, the first subset may be {0-503}, and the second subset may be {504-1007}. If the set of the actual synchronization signal identifiers is {0-1007}, the first subset may be {0-1007}, and the second subset may be {1008-2015}.

The synchronization signal identifier used by the first synchronization signal block may belong to the first subset, that is, the synchronization signal identifier (that is, the actual synchronization signal identifier) of the first synchronization signal block may be used; or the synchronization signal identifier used by the first synchronization signal block may belong to the second subset, that is, the sum of the synchronization signal identifier (that is, the actual synchronization signal identifier) of the first synchronization signal block and the predetermined value is used. The foregoing two cases may be corresponding to cases in which control information is associated and in which control information is not associated.

The first device may: when the first synchronization signal block is associated with the control information, determine that the synchronization signal identifier used by the first synchronization signal block is a synchronization signal identifier of the first synchronization signal block; and/or when the first synchronization signal block is not associated with the control information, determine that the synchronization signal identifier used by the first synchronization signal block is the sum of the synchronization signal identifier of the first synchronization signal block and the predetermined value; or when the first synchronization signal block is associated with the control information, determine that the synchronization signal identifier used by the first synchronization signal block is a sum of the synchronization signal identifier of the first synchronization signal block and the predetermined value; and/or when the first synchronization signal block is not associated with the control information, determine that the synchronization signal identifier used by the first synchronization signal block is the synchronization signal identifier of the first synchronization signal block.

The predetermined value is greater than the difference between the largest value and the smallest value in the value range of the synchronization signal identifier of the first synchronization signal block.

When the synchronization signal identifier used by the first synchronization signal block is the sum of the synchronization signal identifier of the first synchronization signal block and the predetermined value, the second device may obtain the synchronization signal identifier of the first synchronization signal block by subtracting the predetermined value from a detected synchronization signal identifier used by the first synchronization signal block, so that measurement of a neighboring cell initially found by the second device is not affected.

For example, if the value range of the actual synchronization signal identifier is {0-503}, the two subsets may be {0-503} and {504-1007}. Assuming that the synchronization signal identifier of the first synchronization signal block is 1, 1 may be used when the first synchronization signal block is associated with the control information. When the first synchronization signal block is not associated with the control information, 505 may be used, and the second device may obtain the actual synchronization signal identifier 1 by subtracting a predetermined value (504) from the first synchronization signal block identifier. This is not limited. If a value range of the actual synchronization signal identifier is {0-1007}, the two subsets may be {0-1007} and {1008-2015}. Assuming that the synchronization signal identifier of the first synchronization signal block is 1, 1 may be used when the first synchronization signal block is associated with the control information. When the first synchronization signal block is not associated with the control information, 1009 may be used, and the second device may obtain the actual synchronization signal identifier 1 by subtracting a predetermined value (1008) from the first synchronization signal block identifier. This is not limited.

Optionally, in an embodiment of the present invention, the transmission mode of the first synchronization signal block includes a CRC mask used by the physical broadcast channel in the first synchronization signal block; and the first device may: when the first synchronization signal block is associated with the control information, determine that the CRC mask is a first CRC mask of a plurality of predetermined CRC masks; and/or when the first synchronization signal block is not associated with the control information, determine that the CRC mask is a second CRC mask of the plurality of predetermined CRC masks.

Specifically, the first device may determine, based on whether the first synchronization signal block is associated with the control information, the CRC mask used by the physical broadcast channel in the first synchronization signal block, and use different CRC masks for association or non-association.

For example, when a CRC of the physical broadcast channel has a length of 16 bits, two different CRC masks "0000000000000000" and "0000000011111111" may be used to indicate association or non-association.

A process of adding a CRC mask is shown as follows:

$yc(n)=(xc(n)+sc(n))\mod 2$, where $n=0,1,\ldots$, and $N-1$.

N represents a quantity of check bits of CRC, xc represents an original CRC check bit, sc represents a mask with a same length as the CRC, and yc represents a check bit obtained after the CRC is added.

Optionally, in an embodiment of the present invention, the transmission mode of the first synchronization signal block includes a scrambling sequence used by the physical broadcast channel in the first synchronization signal block; and the first device may: when the first synchronization signal block is associated with the control information, determine that the scrambling sequence is a first scrambling sequence of a plurality of predetermined scrambling sequences; and/or when the first synchronization signal block is not associated with the control information, determine that the scrambling sequence is a second scrambling sequence of the plurality of predetermined scrambling sequences.

Specifically, the first device may determine, based on whether the first synchronization signal block is associated with the control information, the scrambling sequence used by the physical broadcast channel in the first synchronization signal block, and use different scrambling sequences for association or non-association.

For example, corresponding scrambling may be performed on information or a coding bit of a before-coded physical broadcast channel or a coded physical broadcast channel. Different sequences are used to correspond to different states (association or non-association). A scrambling process may be shown as follows:

$y(n)=(x(n)+s(n))\mod 2$, where $n=0,1,\ldots$, and $L-1$.

L represents information about a physical broadcast channel or a coding bit length of a physical broadcast channel, x represents information about a before-scrambled physical broadcast channel or a coding bit of a before-scrambled physical broadcast channel, s represents a scrambling sequence, and y represents information about a scrambled physical broadcast channel or a coding bit about a scrambled physical broadcast channel. A different s is generated based on a different state. Different states may correspond to different scrambling sequences, or may correspond to initial values of different scrambling sequences.

According to the technical solution, the second device detects an actual transmission mode of the first synchronization signal block, to determine whether the first synchronization signal block is associated with control information, without performing blind detection on a physical broadcast channel. This can reduce detection complexity of the terminal device, and reduce power consumption and a delay of the terminal device.

630. The second device obtains the first indication information carried on the physical broadcast channel in the first synchronization signal block.

On a receive side, the second device receives the first synchronization signal block, and obtains the first indication information, to directly learn of the resource location of the second synchronization signal block.

Optionally, the second device may further first determine whether the first synchronization signal block is associated with the control information. When determining that the first synchronization signal block is not associated with control information, the second device obtains the first indication information carried on the physical broadcast channel in the first synchronization signal block. When determining that the first synchronization signal block is associated with the control information, the second device receives the control information based on the first synchronization signal block.

In correspondence with a manner in which the first device indicates whether the first synchronization signal block is associated with the control information, the second device may determine, in the corresponding manner, whether the first synchronization signal block is associated with the control information.

Optionally, when the physical broadcast channel carries the second indication information, the second device may determine, based on the second indication information, whether the first synchronization signal block is associated with the control information.

Optionally, when the transmission mode of the first synchronization signal block indicates whether the first synchronization signal block is associated with the control information, the second device may determine, based on the transmission mode of the first synchronization signal block, whether the first synchronization signal block is associated with the control information.

Optionally, the transmission mode of the first synchronization signal block includes a frequency-domain mapping mode of a synchronization signal sequence in the first synchronization signal block; and the second device may: when the mapping mode is a first mapping mode of a plurality of predetermined mapping modes, determine that the first synchronization signal block is associated with the control information; and/or when the mapping mode is a second mapping mode of the plurality of predetermined mapping modes, determine that the first synchronization signal block is not associated with the control information.

Optionally, the transmission mode of the first synchronization signal block includes a value of an orthogonal cover code that is modulated on a transmission symbol of the first synchronization signal block; and the second device may: when the value of the orthogonal cover code is a first value of a plurality of predetermined values, determine that the first synchronization signal block is associated with the control information; and/or when the value of the orthogonal cover code is a second value of the plurality of predetermined values, determine that the first synchronization signal block is not associated with the control information.

Optionally, the transmission mode of the first synchronization signal block includes a range to which a synchronization signal identifier used by the first synchronization signal block belongs; and the second device may: when the synchronization signal identifier used by the first synchronization signal block belongs to a first subset, determine that the first synchronization signal block is associated with the control information; and/or when the synchronization signal identifier used by the first synchronization signal block belongs to a second subset, determine that the first synchronization signal block is not associated with the control information.

Optionally, the transmission mode of the first synchronization signal block includes a CRC mask used by the physical broadcast channel in the first synchronization signal block; and the second device may: when the CRC mask is a first CRC mask of a plurality of predetermined CRC masks, determine that the first synchronization signal block is associated with the control information; and/or when the CRC mask is a second CRC mask of the plurality of predetermined CRC masks, determine that the first synchronization signal block is not associated with the control information.

Optionally, the transmission mode of the first synchronization signal block includes a scrambling sequence used by the physical broadcast channel in the first synchronization signal block; and the second device may: when the scrambling sequence is a first scrambling sequence of a plurality of predetermined scrambling sequences, determine that the first synchronization signal block is associated with the control information; and/or when the scrambling sequence is a second scrambling sequence of the plurality of predetermined scrambling sequences, determine that the first synchronization signal block is not associated with the control information.

Optionally, when the physical broadcast channel carries third indication information, the second device may determine, based on the third indication information, whether the synchronization signal identifier of the first synchronization signal block is the same as a synchronization signal identifier of the second synchronization signal block.

Optionally, when the physical broadcast channel further carries the fourth indication information, and the fourth indication information indicates a synchronization signal identifier of the second synchronization signal block, the second device may determine, based on the fourth indication information, the synchronization signal identifier of the second synchronization signal block.

640. The second device receives the control information based on the first indication information.

The second device learns of the resource location of the second synchronization signal block based on the first indication information, and directly performs search at the corresponding resource location, to receive the control information.

Figure 12:
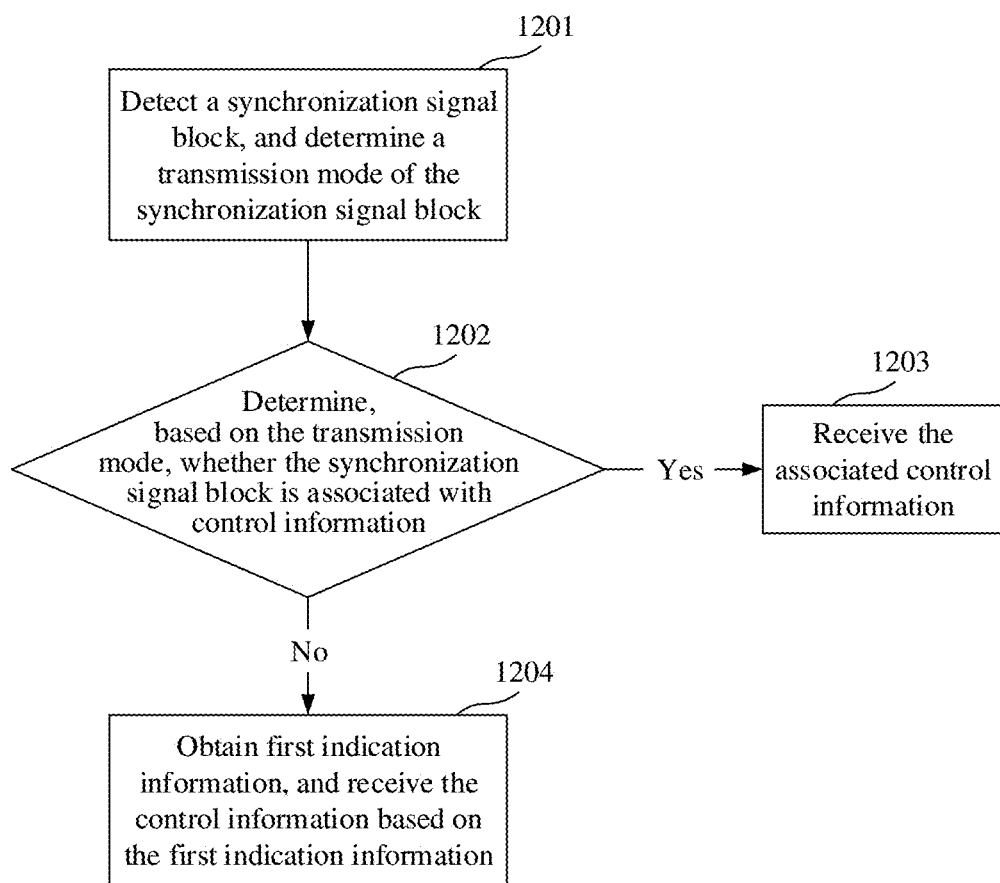
FIG. 12 is a schematic flowchart of a communication method according to still another embodiment of the present invention.

For example, the second device may perform a procedure shown in FIG. 12. In 1201, the second device detects a synchronization signal block, and determines a transmission mode of the synchronization signal block. In 1202, the second device determines, based on the transmission mode of the synchronization signal block, whether the synchronization signal block is associated with control information. If yes, the second device performs 1203, and receives the associated control information. If no, the second device performs 1204, obtains first indication information, and receives the control information based on the first indication information.

According to the technical solution in this embodiment of the present invention, a resource location of a synchronization signal block associated with control information is indicated to the receive side, so that a terminal device on the receive side directly learns of the resource location of the synchronization signal block without performing blind detection, and directly switches to perform search at a corresponding resource location. This can reduce detection complexity of the terminal device, and reduce a search and calculation time, power consumption, and a delay of the terminal device.

In addition, according to the technical solution in this embodiment of the present invention, whether the synchronization signal block is associated with the control information is indicated to the receive side by using the transmission mode of the synchronization signal block, so that the terminal device on the receive side can determine, by detecting the transmission mode of the synchronization signal block, whether the synchronization signal block is associated with the control information, without performing blind detection on the physical broadcast channel. This can reduce the detection complexity of the terminal device, and reduce the power consumption and the delay of the terminal device.

It should be understood that various implementations of the embodiments of the present invention may be implemented separately, or may be implemented in combination. This is not limited in the embodiments of the present invention.

For example, in the embodiments of the present invention, an implementation of indicating, to the receive side, the resource location of the synchronization signal block associated with the control information and an implementation of indicating, to the receive side by using the transmission mode of a synchronization signal block, whether the synchronization signal block is associated with control information may be separately implemented, or may be implemented in combination. The following separately describes the implementation of indicating, to the receive side by using the transmission mode of the synchronization signal block, whether the synchronization signal block is associated with the control information. It should be understood that in addition to the following descriptions, for the following embodiments, reference may further be made to the descriptions in the foregoing embodiments. For brevity, details are not described hereinafter again.

Figure 13:
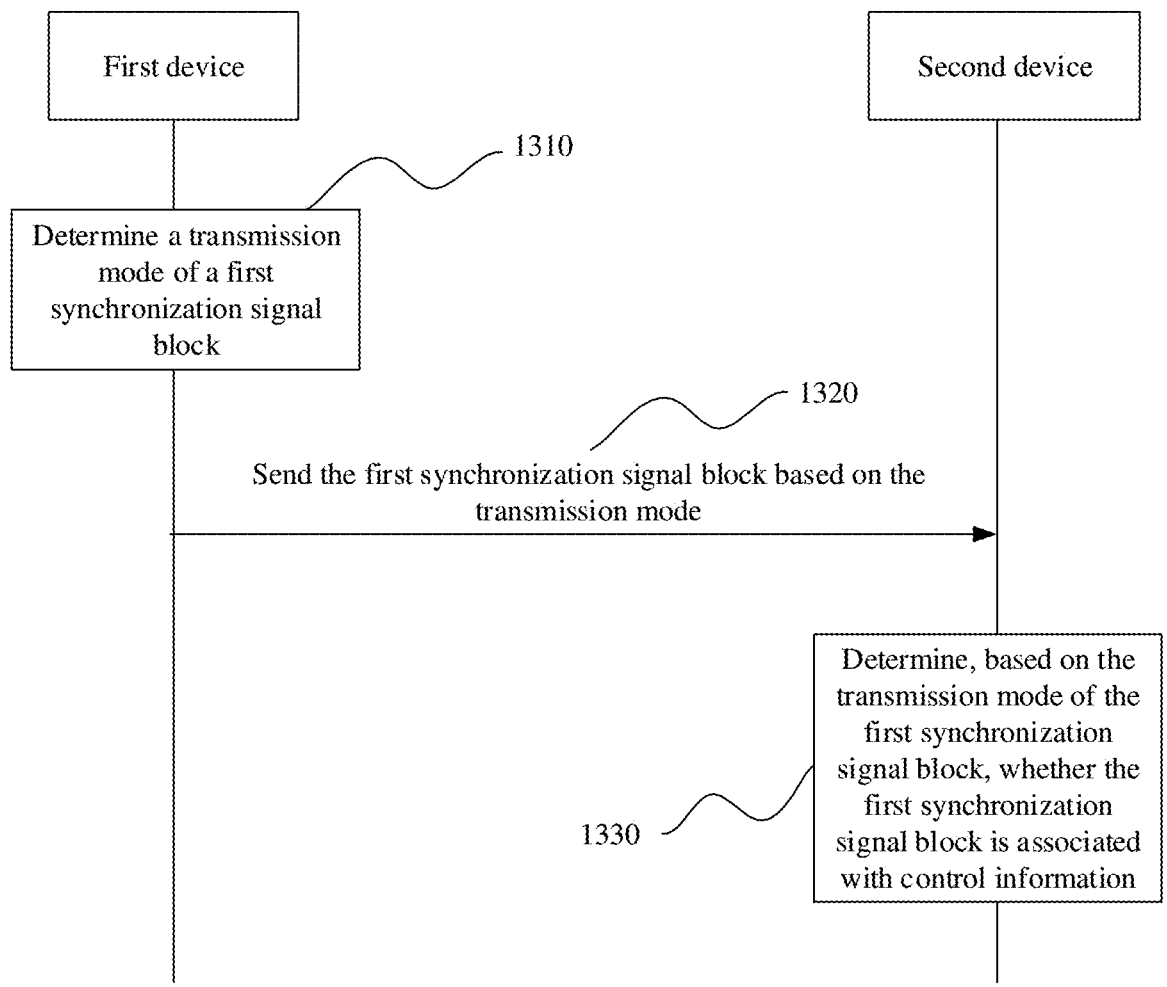
FIG. 13 is a schematic flowchart of a communication method according to still another embodiment of the present invention.

FIG. 13 is a schematic flowchart of a communication method according to another embodiment of the present invention.

1310. A first device determines a transmission mode of a first synchronization signal block, where the transmission mode indicates whether the first synchronization signal block is associated with control information.

The first device determines the transmission mode of the first synchronization signal block based on whether the first synchronization signal block is associated with the control information. The transmission mode may include a frequency-domain mapping mode of a synchronization signal sequence, an orthogonal cover code, a synchronization signal identifier, a CRC mask of a physical broadcast channel, scrambling of a physical broadcast channel, or the like. For specific descriptions of each transmission mode, refer to corresponding descriptions in the foregoing embodiments. For brevity, details are not described again.

1320. The first device sends the first synchronization signal block based on the transmission mode.

Corresponding to different cases about whether the first synchronization signal block is associated with the control information, the first device sends the first synchronization signal block based on a corresponding transmission mode, to implicitly indicate that the first synchronization signal block is associated with the control information or that the first synchronization signal block is not associated with the control information.

1330. A second device determines, based on the transmission mode of the first synchronization signal block, whether the first synchronization signal block is associated with control information.

The second device receives the first synchronization signal block, and determines, based on the transmission mode of the first synchronization signal block, whether the first synchronization signal block is associated with the control information. For specific descriptions of each transmission mode, refer to corresponding descriptions in the foregoing embodiments. For brevity, details are not described again.

When determining, based on the transmission mode of the first synchronization signal block, that the first synchronization signal block is not associated with the control information, the second device does not need to perform blind detection on the physical broadcast channel, may exit detection of the first synchronization signal block, and then detect another synchronization signal block.

When the first synchronization signal block is associated with the control information, the second device may receive the control information based on the first synchronization signal block.

Figure 14:
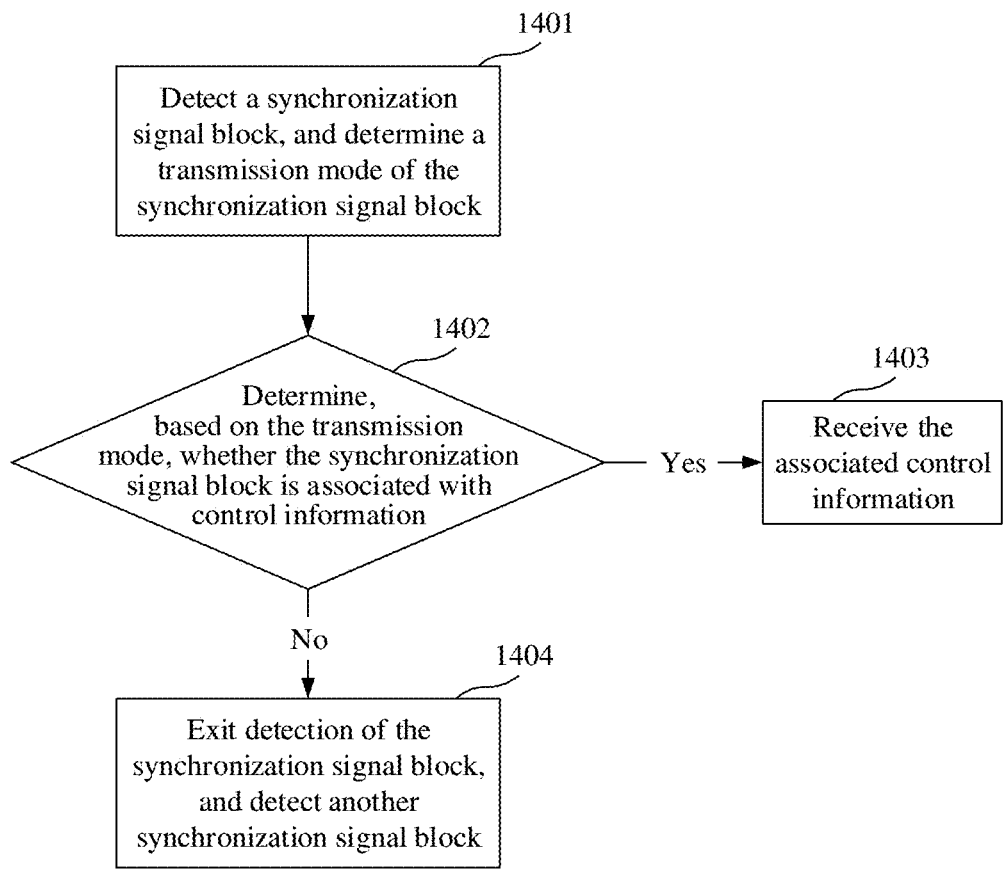
FIG. 14 is a schematic flowchart of a communication method according to still another embodiment of the present invention.

For example, the second device may perform a procedure shown in FIG. 14. In 1401, the second device detects a synchronization signal block, and determines a transmission mode of the synchronization signal block. In 1402, the second device determines, based on the transmission mode of the synchronization signal block, whether the synchronization signal block is associated with control information. If yes, the second device performs 1403, and receives the associated control information. If no, the second device performs 1404, exits detection of the synchronization signal block, and detects another synchronization signal block.

According to the technical solution in this embodiment of the present invention, whether the synchronization signal block is associated with the control information is indicated to the receive side by using the transmission mode of the synchronization signal block, so that the terminal device on the receive side can determine, by detecting the transmission mode of the synchronization signal block, whether the synchronization signal block is associated with the control information, without performing blind detection on a physical broadcast channel. This can reduce detection complexity of the terminal device, and reduce power consumption and a delay of the terminal device.

It should be understood that the specific examples in the embodiments of the present invention are to help a person skilled in the art better understand the embodiments of the present invention, rather than to limit the scope of the embodiments of the present invention.

It should be understood that, in various embodiments of the present invention, sequence numbers of the foregoing processes do not mean execution sequences. The execution sequences of the processes should be determined based on functions and internal logic of the processes, and shall not constitute any limitation on the implementation processes of the embodiments of the present invention.

The foregoing describes the communication method according to the embodiments of the present invention in detail. The following describes communications devices according to the embodiments of the present invention.

Figure 15:
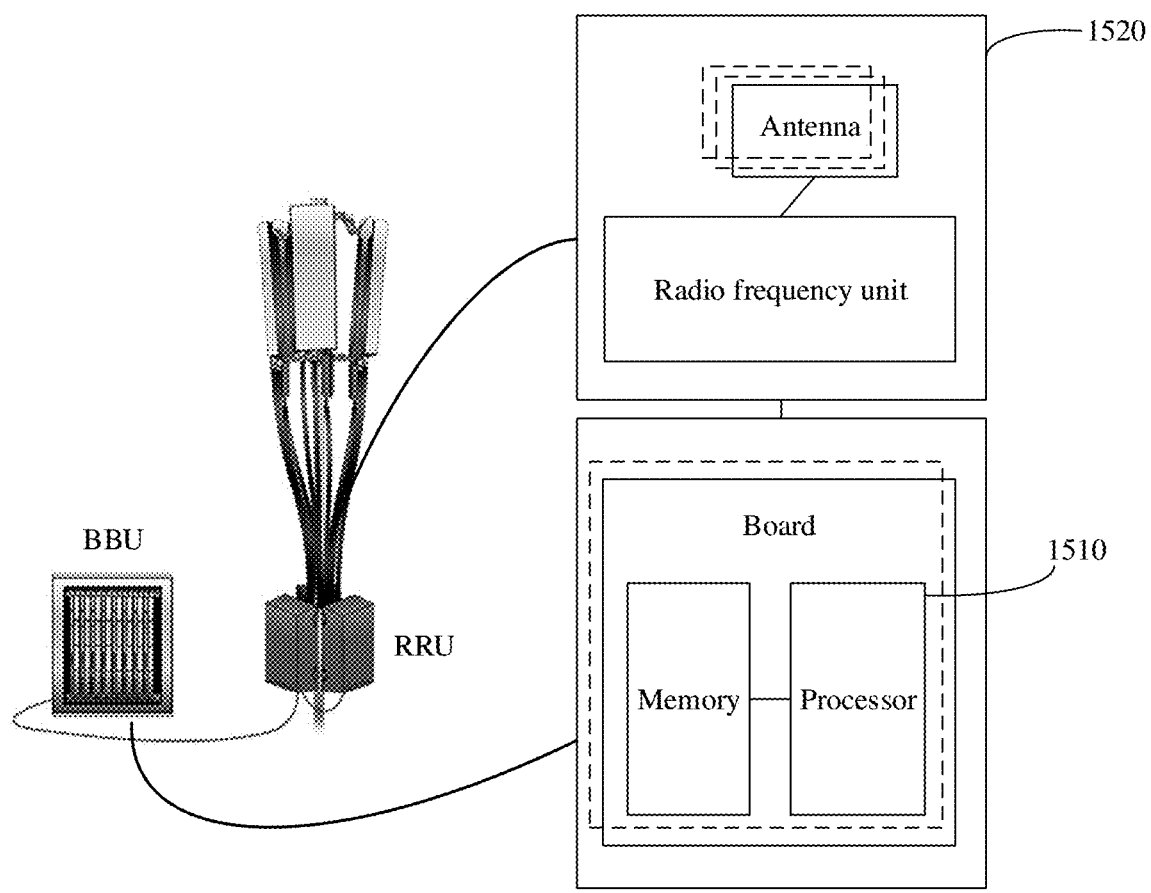
FIG. 15 is a schematic block diagram of a communications device according to an embodiment of the present invention.

FIG. 15 is a schematic diagram of a communications device according to an embodiment of the present invention. The communications device may correspond to the first device in the method embodiments, and may have any function of the first device in the methods.

As shown in FIG. 15, the communications device includes a processor 1510 and a transceiver 1520.

Optionally, the transceiver 1520 may be referred to as a remote radio unit (remote radio unit, RRU), a transceiver unit, a transceiver machine, a transceiver circuit, or the like. The transceiver 1520 may include at least one antenna and a radio frequency unit. The transceiver 1520 may be configured to: transmit and receive a radio frequency signal, and perform conversion between a radio frequency signal and a baseband signal.

Optionally, the communications device may include a baseband unit (baseband unit, BBU), and the baseband unit includes the processor 1510. The baseband unit may be configured to: perform baseband processing such as channel coding, multiplexing, modulation, or spectrum spreading, and control a network device. The transceiver 1520 and the baseband unit may be physically disposed together; or may be physically disposed separately, that is, the communications device is a distributed network device.

In an example, the baseband unit may include one or more boards, and the plurality of boards may jointly support a radio access network of a single access standard, or may respectively support radio access networks of different access standards.

In an example, the baseband unit may be reconstructed as the foregoing functional entity DU and the foregoing functional entity CU.

The baseband unit includes the processor 1510. The processor 1510 may be configured to control the communications device to perform corresponding operations in the foregoing method embodiments. Optionally, the baseband unit may further include a memory, configured to store a necessary instruction and necessary data.

In an embodiment, the processor 1510 is configured to determine first indication information, where the first indication information indicates a resource location of a second synchronization signal block, and the second synchronization signal block is associated with control information; and the transceiver 1520 is configured to send a first synchronization signal block, where a physical broadcast channel in the first synchronization signal block carries the first indication information determined by the processor 1510.

Optionally, the processor 1510 is specifically configured to: when the first synchronization signal block is not associated with the control information, determine the first indication information.

Optionally, the processor 1510 is further configured to determine a transmission mode of the first synchronization signal block, where the transmission mode indicates whether the first synchronization signal block is associated with the control information; and the transceiver 1520 is specifically configured to send the first synchronization signal block based on the transmission mode.

Optionally, the processor 1510 is specifically configured to: when the transmission mode of the first synchronization signal block includes a frequency-domain mapping mode of a synchronization signal sequence in the first synchronization signal block, when the first synchronization signal block is associated with the control information, determine that the mapping mode is a first mapping mode of a plurality of predetermined mapping modes; or when the first synchronization signal block is not associated with the control information, determine that the mapping mode is a second mapping mode of the plurality of predetermined mapping modes.

Optionally, the processor 1510 is specifically configured to: when the transmission mode of the first synchronization signal block includes a value of an orthogonal cover code that is modulated on a transmission symbol of the first synchronization signal block, when the first synchronization signal block is associated with the control information, determine that the value of the orthogonal cover code is a first value of a plurality of predetermined values; and/or when the first synchronization signal block is not associated with the control information, determine that the value of the orthogonal cover code is a second value of the plurality of predetermined values.

Optionally, the processor 1510 is specifically configured to: when the transmission mode of the first synchronization signal block includes a range to which a synchronization signal identifier used by the first synchronization signal block belongs, when the first synchronization signal block is associated with the control information, determine that the synchronization signal identifier used by the first synchronization signal block belongs to a first subset; and/owhen the first synchronization signal block is not associated with the control information, determine that the synchronization signal identifier used by the first synchronization signal block belongs to a second subset.

Optionally, the processor 1510 is specifically configured to: when the first synchronization signal block is associated with the control information, determine that the synchronization signal identifier used by the first synchronization signal block is a synchronization signal identifier of the first synchronization signal block; and/or when the first synchronization signal block is not associated with the control information, determine that the synchronization signal identifier used by the first synchronization signal block is a sum of a synchronization signal identifier of the first synchronization signal block and a predetermined value; or when the first synchronization signal block is associated with the control information, determine that the synchronization signal identifier used by the first synchronization signal block is a sum of a synchronization signal identifier of the first synchronization signal block and a predetermined value; and/or when the first synchronization signal block is not associated with the control information, determine that the synchronization signal identifier used by the first synchronization signal block is a synchronization signal identifier of the first synchronization signal block.

The predetermined value is greater than a difference between a largest value and a smallest value in a value range of the synchronization signal identifier of the first synchronization signal block.

Optionally, the processor 1510 is specifically configured to: when the transmission mode of the first synchronization signal block includes a cyclic redundancy check CRC mask used by the physical broadcast channel in the first synchronization signal block, when the first synchronization signal block is associated with the control information, determine that the CRC mask is a first CRC mask of a plurality of predetermined CRC masks; and/or when the first synchronization signal block is not associated with the control information, determine that the CRC mask is a second CRC mask of the plurality of predetermined CRC masks.

Optionally, the processor 1510 is specifically configured to: when the transmission mode of the first synchronization signal block includes a scrambling sequence used by the physical broadcast channel in the first synchronization signal block, when the first synchronization signal block is associated with the control information, determine that the scrambling sequence is a first scrambling sequence of a plurality of predetermined scrambling sequences; and/or when the first synchronization signal block is not associated with the control information, determine that the scrambling sequence is a second scrambling sequence of the plurality of predetermined scrambling sequences.

Optionally, the physical broadcast channel further carries second indication information, and the second indication information indicates whether the first synchronization signal block is associated with the control information.

Optionally, the first indication information is carried in a reserved field of the physical broadcast channel.

Optionally, the physical broadcast channel includes three fields, where a first field is valid only when the first synchronization signal block is associated with the control information; a second field is valid only when the first synchronization signal block is not associated with the control information, and the second field carries the first indication information; and a third field is valid when the first synchronization signal block is associated with or when the first synchronization signal block is not associated with the control information.

Optionally, bits occupied by the first field in the physical broadcast channel partially or completely overlap bits occupied by the second field in the physical broadcast channel.

Optionally, the physical broadcast channel further carries third indication information, and the third indication information indicates whether the synchronization signal identifier of the first synchronization signal block is the same as a synchronization signal identifier of the second synchronization signal block.

Optionally, the physical broadcast channel further carries fourth indication information, and the fourth indication information indicates a synchronization signal identifier of the second synchronization signal block.

Optionally, the resource location is an absolute location of the second synchronization signal block in a bandwidth or a relative location relative to the first synchronization signal block.

In another embodiment, the processor 1510 is configured to determine a transmission mode of the first synchronization signal block, where the transmission mode indicates whether the first synchronization signal block is associated with control information; and the transceiver 1520 is configured to send the first synchronization signal block based on the transmission mode.

Optionally, the transmission mode of the first synchronization signal block includes a frequency-domain mapping mode of a synchronization signal sequence in the first synchronization signal block; and the processor 1510 is specifically configured to when the first synchronization signal block is associated with the control information, determine that the mapping mode is a first mapping mode of a plurality of predetermined mapping modes; and/or when the first synchronization signal block is not associated with the control information, determine that the mapping mode is a second mapping mode of the plurality of predetermined mapping modes.

Optionally, the transmission mode of the first synchronization signal block includes a value of an orthogonal cover code that is modulated on a transmission symbol of the first synchronization signal block; and the processor 1510 is specifically configured to: when the first synchronization signal block is associated with the control information, determine that the value of the orthogonal cover code is a first value of a plurality of predetermined values; and/or when the first synchronization signal block is not associated with the control information, determine that the value of the orthogonal cover code is a second value of the plurality of predetermined values.

Optionally, the transmission mode of the first synchronization signal block includes a range to which a synchronization signal identifier used by the first synchronization signal block belongs; and the processor 1510 is specifically configured to: when the first synchronization signal block is associated with the control information, determine that the synchronization signal identifier used by the first synchronization signal block belongs to a first subset; and/or when the first synchronization signal block is not associated with the control information, determine that the synchronization signal identifier used by the first synchronization signal block belongs to a second subset.

Optionally, the processor 1510 is specifically configured to: when the first synchronization signal block is associated with the control information, determine that the synchronization signal identifier used by the first synchronization signal block is a synchronization signal identifier of the first synchronization signal block; and/or when the first synchronization signal block is not associated with the control information, determine that the synchronization signal identifier used by the first synchronization signal block is a sum of a synchronization signal identifier of the first synchronization signal block and a predetermined value; or when the first synchronization signal block is associated with the control information, determine that the synchronization signal identifier used by the first synchronization signal block is a sum of a synchronization signal identifier of the first synchronization signal block and a predetermined value; and/or when the first synchronization signal block is not associated with the control information, determine that the synchronization signal identifier used by the first synchronization signal block is a synchronization signal identifier of the first synchronization signal block.

The predetermined value is greater than a difference between a largest value and a smallest value in a value range of the synchronization signal identifier of the first synchronization signal block.

Optionally, the transmission mode of the first synchronization signal block includes a CRC mask used by the physical broadcast channel in the first synchronization signal block; and the processor 1510 is specifically configured to: when the first synchronization signal block is associated with the control information, determine that the CRC mask is a first CRC mask of a plurality of predetermined CRC masks; and/or when the first synchronization signal block is not associated with the control information, determine that the CRC mask is a second CRC mask of the plurality of predetermined CRC masks.

Optionally, the transmission mode of the first synchronization signal block includes a scrambling sequence used by the physical broadcast channel in the first synchronization signal block; and the processor 1510 is specifically configured to: when the first synchronization signal block is associated with the control information, determine that the scrambling sequence is a first scrambling sequence of a plurality of predetermined scrambling sequences; and/or when the first synchronization signal block is not associated with the control information, determine that the scrambling sequence is a second scrambling sequence of the plurality of predetermined scrambling sequences.

Figure 16:
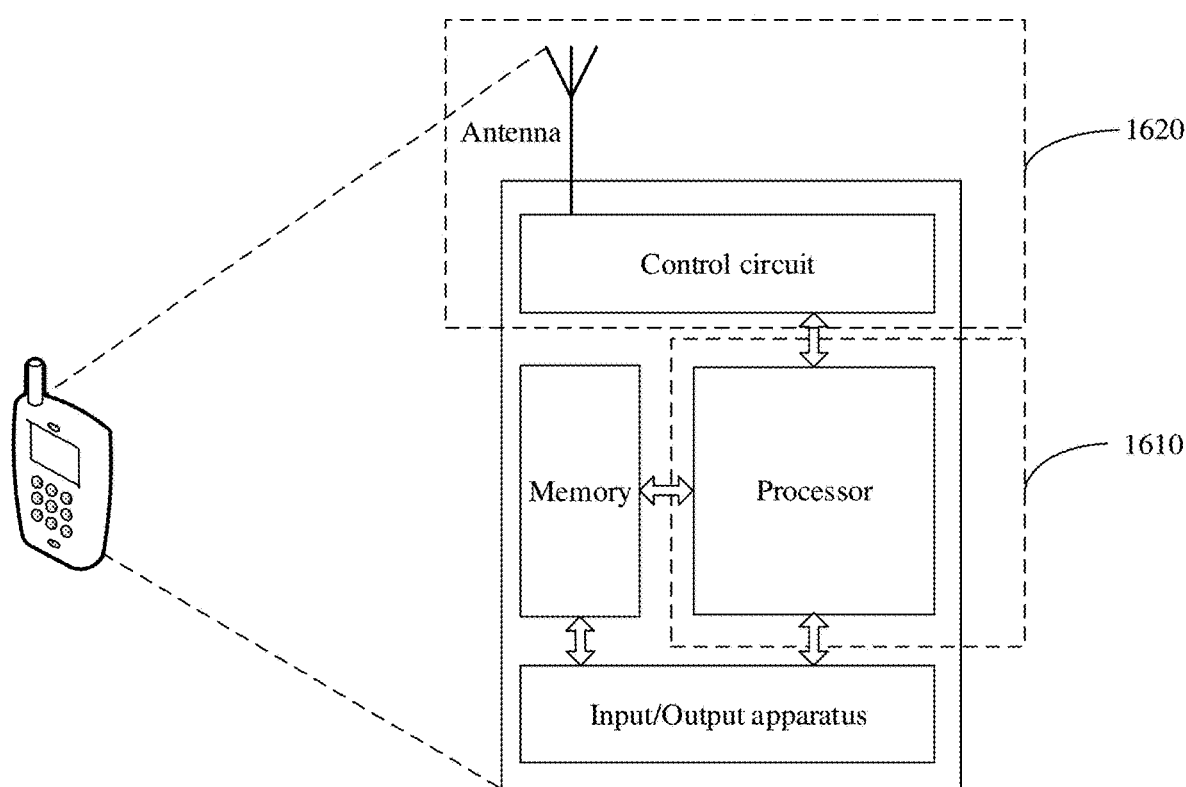
FIG. 16 is a schematic block diagram of a communications device according to another embodiment of the present invention.

FIG. 16 is a schematic diagram of a communications device according to another embodiment of the present invention. The communications device may correspond to the second device in the method embodiments, and may have any function of the second device in the methods.

As shown in FIG. 16, the communications device includes a processor 1610 and a transceiver 1620.

Optionally, the transceiver 1620 may include a control circuit and an antenna. The control circuit may be configured to: perform conversion between a baseband signal and a radio frequency signal, and process the radio frequency signal. The antenna may be configured to receive and send a radio frequency signal.

Optionally, the communications device may further include other main components of the terminal device, for example, a memory and an input/output apparatus.

The processor 1610 may be configured to: process a communication protocol and communication data, control an entire communications device, execute a software program, and process data of the software program, for example, configured to support the communications device in performing a corresponding operation in the foregoing method embodiments. The memory is mainly configured to store a software program and data. After the communications device is powered on, the processor 1610 may read the software program from the memory, interpret and execute an instruction of the software program, and process data of the software program.

In an embodiment, the transceiver 1620 is configured to receive a first synchronization signal block; the processor 1610 is configured to: determine that the first synchronization signal block received by the transceiver 1620 is not associated with control information, and obtain first indication information carried on a physical broadcast channel in the first synchronization signal block, where the first indication information indicates a resource location of a second synchronization signal block, and the second synchronization signal block is associated with the control information; and the transceiver 1620 is configured to receive the control information based on the first indication information obtained by the processor 1610.

Optionally, the processor 1610 is further configured to determine that the first synchronization signal block is associated with the control information, and the transceiver 1620 is further configured to receive the control information based on the first synchronization signal block.

Optionally, the processor 1610 is specifically configured to: when the transmission mode of the first synchronization signal block indicates whether the first synchronization signal block is associated with the control information, determine, based on the transmission mode of the first synchronization signal block, whether the first synchronization signal block is associated with the control information.

Optionally, the processor 1610 is specifically configured to: when the transmission mode of the first synchronization signal block includes a frequency-domain mapping mode of a synchronization signal sequence in the first synchronization signal block, when the mapping mode is a first mapping mode of a plurality of predetermined mapping modes, determine that the first synchronization signal block is associated with the control information; and/or when the mapping mode is a second mapping mode of the plurality of predetermined mapping modes, determine that the first synchronization signal block is not associated with the control information.

Optionally, the processor 1610 is specifically configured to: when the transmission mode of the first synchronization signal block includes a value of an orthogonal cover code that is modulated on a transmission symbol of the first synchronization signal block, when the value of the orthogonal cover code is a first value of a plurality of predetermined values, determine that the first synchronization signal block is associated with the control information; and/or when the value of the orthogonal cover code is a second value of the plurality of predetermined values, determine that the first synchronization signal block is not associated with the control information.

Optionally, the processor 1610 is specifically configured to: when the transmission mode of the first synchronization signal block includes a range to which a synchronization signal identifier used by the first synchronization signal block belongs, when the synchronization signal identifier used by the first synchronization signal block belongs to a first subset, determine that the first synchronization signal block is associated with the control information; and/or when the synchronization signal identifier used by the first synchronization signal block belongs to a second subset, determine that the first synchronization signal block is not associated with the control information.

Optionally, the processor 1610 is specifically configured to: when the transmission mode of the first synchronization signal block includes a cyclic redundancy check CRC mask used by the physical broadcast channel in the first synchronization signal block, when the CRC mask is a first CRC mask of a plurality of predetermined CRC masks, determine that the first synchronization signal block is associated with the control information; and/or when the CRC mask is a second CRC mask of the plurality of predetermined CRC masks, determine that the first synchronization signal block is not associated with the control information.

Optionally, the processor 1610 is specifically configured to: when the transmission mode of the first synchronization signal block includes a scrambling sequence used by the physical broadcast channel in the first synchronization signal block, when the scrambling sequence is a first scrambling sequence of a plurality of predetermined scrambling sequences, determine that the first synchronization signal block is associated with the control information; and/or when the scrambling sequence is a second scrambling sequence of the plurality of predetermined scrambling sequences, determine that the first synchronization signal block is not associated with the control information.

Optionally, the processor 1610 is specifically configured to: when the physical broadcast channel carries second indication information, and the second indication information indicates whether the first synchronization signal block is associated with the control information, determine, based on the second indication information, whether the first synchronization signal block is associated with the control information.

Optionally, the first indication information is carried in a reserved field of the physical broadcast channel.

Optionally, the physical broadcast channel includes three fields, where a first field is valid only when the first synchronization signal block is associated with the control information; a second field is valid only when the first synchronization signal block is not associated with the control information, and the second field carries the first indication information; and a third field is valid when the first synchronization signal block is associated with or when the first synchronization signal block is not associated with the control information.

Optionally, bits occupied by the first field in the physical broadcast channel partially or completely overlap bits occupied by the second field in the physical broadcast channel.

Optionally, the physical broadcast channel carries third indication information, and the third indication information indicates whether a synchronization signal identifier of the first synchronization signal block is the same as a synchronization signal identifier of the second synchronization signal block; and the processor 1610 is further configured to determine, based on the third indication information, whether a synchronization signal identifier of the first synchronization signal block is the same as a synchronization signal identifier of the second synchronization signal block.

Optionally, the physical broadcast channel carries fourth indication information, and the fourth indication information indicates a synchronization signal identifier of the second synchronization signal block; and the processor 1610 is further configured to determine the synchronization signal identifier of the second synchronization signal block based on the fourth indication information.

Optionally, the resource location is an absolute location of the second synchronization signal block in a bandwidth or a relative location relative to the first synchronization signal block.

In an embodiment, the transceiver 1620 is configured to receive a first synchronization signal block; and the processor 1610 is configured to determine, based on a transmission mode of the first synchronization signal block, whether the first synchronization signal block is associated with control information.

Optionally, the transmission mode of the first synchronization signal block includes a frequency-domain mapping mode of a synchronization signal sequence in the first synchronization signal block; and the processor 1610 is specifically configured to: when the mapping mode is a first mapping mode of a plurality of predetermined mapping modes, determine that the first synchronization signal block is associated with the control information; and/or when the mapping mode is a second mapping mode of the plurality of predetermined mapping modes, determine that the first synchronization signal block is not associated with the control information.

Optionally, the transmission mode of the first synchronization signal block includes a value of an orthogonal cover code that is modulated on a transmission symbol of the first synchronization signal block; and the processor 1610 is specifically configured to: when the value of the orthogonal cover code is a first value of a plurality of predetermined values, determine that the first synchronization signal block is associated with the control information; and/or when the value of the orthogonal cover code is a second value of the plurality of predetermined values, determine that the first synchronization signal block is not associated with the control information.

Optionally, the transmission mode of the first synchronization signal block includes a range to which a synchronization signal identifier used by the first synchronization signal block belongs; and the processor 1610 is specifically configured to: when the synchronization signal identifier used by the first synchronization signal block belongs to a first subset, determine that the first synchronization signal block is associated with the control information; and/or when the synchronization signal identifier used by the first synchronization signal block belongs to a second subset, determine that the first synchronization signal block is not associated with the control information.

Optionally, the transmission mode of the first synchronization signal block includes a CRC mask used by the physical broadcast channel in the first synchronization signal block; and the processor 1610 is specifically configured to: when the CRC mask is a first CRC mask of a plurality of predetermined CRC masks, determine that the first synchronization signal block is associated with the control information; and/or when the CRC mask is a second CRC mask of the plurality of predetermined CRC masks, determine that the first synchronization signal block is not associated with the control information.

Optionally, the transmission mode of the first synchronization signal block includes a scrambling sequence used by the physical broadcast channel in the first synchronization signal block; and the processor 1610 is specifically configured to: when the scrambling sequence is a first scrambling sequence of a plurality of predetermined scrambling sequences, determine that the first synchronization signal block is associated with the control information; and/or when the scrambling sequence is a second scrambling sequence of the plurality of predetermined scrambling sequences, determine that the first synchronization signal block is not associated with the control information.

Optionally, the transceiver 1620 is further configured to: when the first synchronization signal block is associated with the control information, receive the control information based on the first synchronization signal block.

It should be understood that the processor 1510 or the processor 1610 in the embodiments of the present invention may be implemented by using a processing unit or a chip. Optionally, the processing unit may include a plurality of units in an implementation process.

It should be understood that the transceiver 1520 or the transceiver 1620 in the embodiments of the present invention may be implemented by using a transceiver unit or a chip. Optionally, the transceiver 1520 or the transceiver 1620 may include a transmitter or a receiver, or may include a transmission unit or a receiving unit.

It should be understood that the processor 1510 and the transceiver 1520 in the embodiments of the present invention may be implemented by using a chip, and the processor 1610 and the transceiver 1620 may be implemented by using a chip.

Optionally, the communications device may further include a memory. The memory may store program code, and the processor invokes the program code stored in the memory, to implement a corresponding function of the communications device. Optionally, the processor and the memory may be implemented by using a chip.

An embodiment of the present invention further provides a processing apparatus, including a processor and an interface.

The processor is configured to perform the methods in the foregoing embodiments of the present invention.

The processing apparatus may be a chip. The processor may be implemented by hardware or software. When the processor is implemented by hardware, the processor may be a logic circuit, an integrated circuit, or the like. When the processor is implemented by software, the processor may be a general purpose processor, and is implemented by reading software code stored in a memory. The memory may be integrated into the processor, or may exist independently outside the processor.

For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

An embodiment of the present invention further provides a communications device, including a processing unit and a transceiver unit. The processing unit and the transceiver unit may be implemented by software or may be implemented by hardware. When implemented by hardware, the processing unit may be the processor 1510 in FIG. 15, and the transceiver unit may be the transceiver 1520 in FIG. 15; or the processing unit may be the processor 1610 in FIG. 16, and the transceiver unit may be the transceiver 1620 in FIG. 16.

An embodiment of the present invention further provides a communications system, including the foregoing first device and the foregoing second device.

The following clearly describes the technical solutions in the embodiments of this application with reference to the accompanying drawings in the embodiments of this application.

Figure 17:
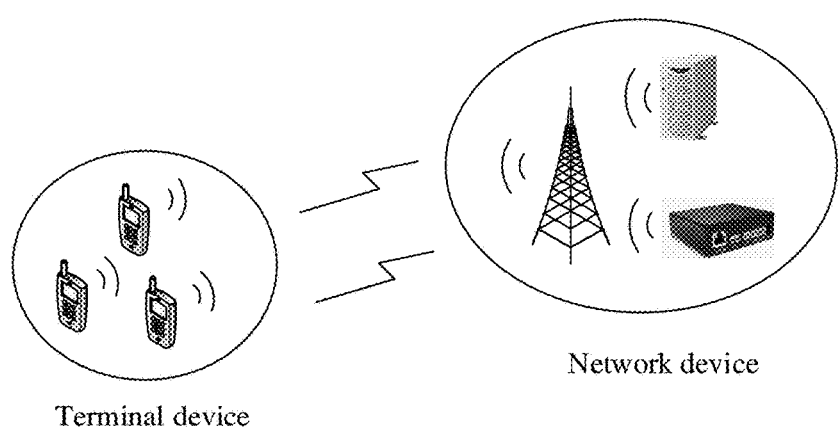
FIG. 17 is a schematic diagram of an application scenario according to an implementation of this application.

FIG. 17 is a simplified schematic diagram of a network architecture to which the embodiments of this application are applied. The network architecture may be a network architecture of a wireless communications system, and may include a network device and a terminal device. The network device and the terminal device are connected by using a wireless communications technology. It should be noted that quantities and forms of the terminal devices and the network devices shown in FIG. 17 do not constitute any limitation on the embodiments of this application. In different implementations, one network device may be connected to one or more terminal devices. The network device may further be connected to a core network device, where the core network device is not shown in FIG. 1.

It should be noted that the wireless communications system in this embodiment of this application includes but is not limited to a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA 2000) system, a time division-synchronous code division multiple access (TD-SCDMA) system, a long term evolution (LTE) system, a 5th generation mobile communications system, and a future mobile communications system.

In this application, terms "network" and "system" may be interchangeably used, but a person skilled in the art can understand meanings of the terms. In addition, some English abbreviations in this specification are descriptions of the embodiments of this application by using an LTE system as an example, and the English abbreviations may change with network evolution. For specific evolution, refer to descriptions in corresponding standards.

Figure 18:
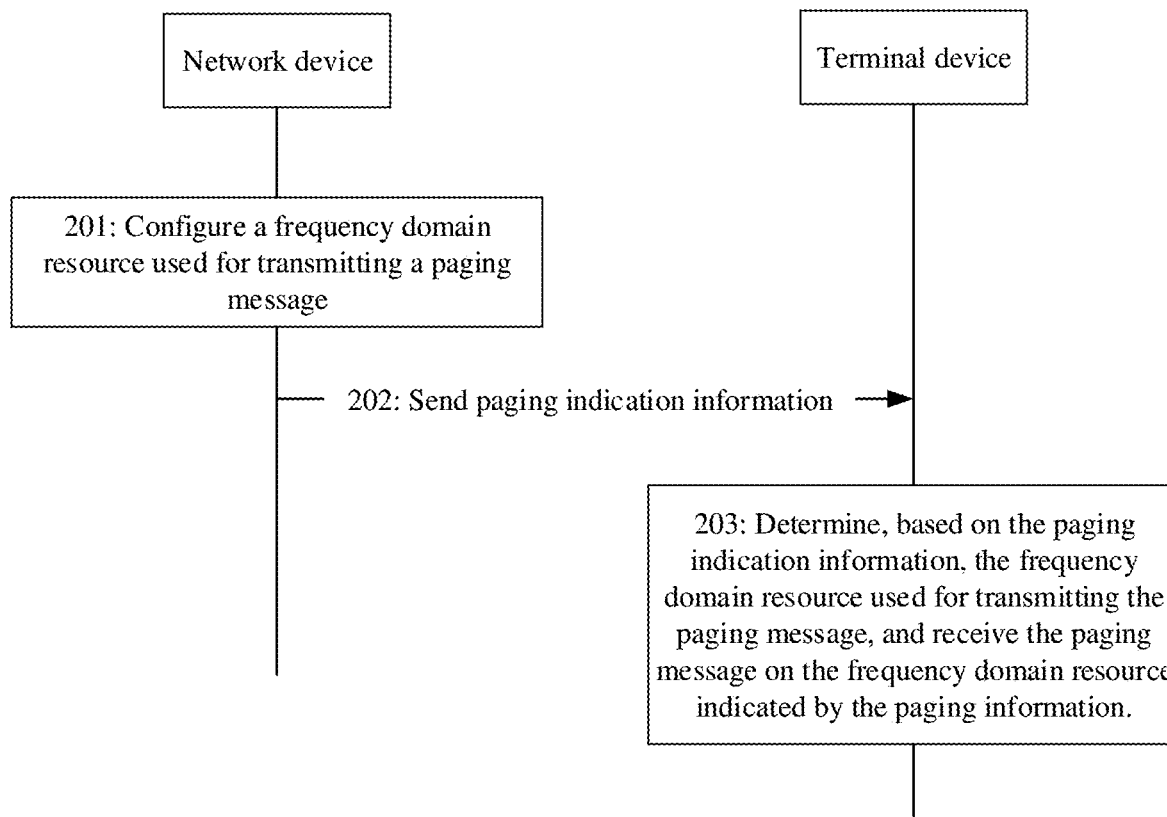
FIG. 18 is a schematic flowchart of a paging message transmission method according to this application.

FIG. 18 is a schematic flowchart of a paging message transmission method according to an embodiment of this application. The method is implemented through interaction between a network device and a terminal device. The network device may be a base station in a cellular network, or may be a radio access point in Wi-Fi.

1801: The network device configures a frequency domain resource used for transmitting a paging message.

1802: The network device sends paging indication information to the terminal device, where the paging indication information is used to indicate the frequency domain resource used for transmitting the paging message.

1803: The terminal device receives the paging indication information, and obtains the paging message based on the paging indication information.

The following describes step 1801 in detail.

The frequency domain resource used for transmitting the paging message may be a bandwidth part (BWP). Usually, one BWP corresponds to one terminal device. During initial access, a default BWP bandwidth or subband is allocated to the terminal device. In different implementations, a BWP may include a group of contiguous physical resource blocks (PRB), the BWP may be a subband on a single wideband carrier, or the BWP may be a CC bandwidth in carrier aggregation (CA).

The following describes step 1802 in detail.

In an implementation, the paging indication information may be a paging reference identifier. It can be understood that, regardless of the paging indication information or the paging reference identifier, a function of the paging indication information or the paging reference identifier is to indicate existence of the paging message or indicate a location of the paging message. The foregoing names are merely examples for description, and are not intended to limit the information. The following uses the paging reference identifier as an example for description.

In different implementations, the network device may add the paging reference identifier to different signaling for sending. The following provides example descriptions for different signaling.

(1) The network device adds the paging reference identifier to a synchronization signal block (SSB) for sending. Specifically, the paging reference identifier is carried on a physical broadcast channel (PBCH) of an SSB. In a possible implementation, the paging reference identifier carried on the PBCH is used to indicate whether there is an associated paging message. When finding the SSB, the terminal device may determine, based on the paging reference identifier in the SSB, whether the found SSB has an associated paging message. In another possible implementation, the paging indication information carried on the PBCH is used to indicate a location of an associated paging message. When finding the SSB, the terminal may receive the paging message at the corresponding location based on the paging indication information in the SSB.

(2) The paging reference identifier may alternatively be a camp on available flag bit on a PBCH. The network device reuses the camp on available flag bit on the PBCH to indicate a paging message associated with an SSB. Therefore, when receiving the SSB, the terminal device indicates, based on the camp on available flag bit on the PBCH, whether there is a paging message associated with the SSB.

(3) The paging reference identifier may be alternatively carried in remaining system information (RMSI) for sending. Therefore, the terminal device may determine, based on the paging reference identifier in the found RMSI, whether there is an associated paging message in the found RMSI.

(4) When RMSI corresponds to the paging message, that is, when an SSB has associated RMSI, it indicates that the SSB is also associated with the paging message; or when an SSB has no associated RMSI, it indicates that the SSB has no associated paging message. In this case, the paging reference identifier may be an RMSI presence flag on a PBCH, and the network device reuses the RMSI presence flag on the PBCH, to indicate whether there is a paging message associated with the SSB. The RMSI presence flag is used to indicate whether the SSB has associated RMSI. Therefore, the terminal device may determine, based on the found RMSI presence flag on the PBCH in the SSB, whether the found SSB has an associated paging message.

For example, the paging reference identifier may be "0" or "1", to identify whether there is an associated paging message. The network device may use "0" to indicate that there is an associated paging message, and use "1" to indicate that there is no associated paging message. Alternatively, the network device may use "1" to indicate that there is an associated paging message, and use "0" to indicate that there is no associated paging message.

In an embodiment, the network device sends a paging message in a default BWP. In other words, when determining, based on a paging reference identifier, that there is a paging message, the terminal device may search for or receive the paging message in the default BWP. The default BWP may be a BWP carrying an SSB, or the default BWP may be a BWP carrying RMSI.

In another embodiment, the network device indicates a BWP carrying a paging message. In other words, when determining, based on a paging reference identifier, that there is a paging message, the terminal device may search for or receive the paging message in the indicated BWP. For example, the BWP carrying the paging message may be a BWP of a physical downlink shared channel (PDSCH) that carries the paging message. Alternatively, the BWP may be a BWP of a CORESET on a physical downlink control channel (PDCCH) that carries and is used to schedule the paging message. Alternatively, the BWP may be a BWP of a PDSCH carrying the paging message and a CORSET on a PDCCH that is used to schedule the paging message. The network device may indicate the BWP by using the paging reference identifier, or the network device may send, to the terminal device, information indicating a location, so that the terminal device can search for the paging message in the indicated BWP. The specific indication method is described below.

Figure 19:
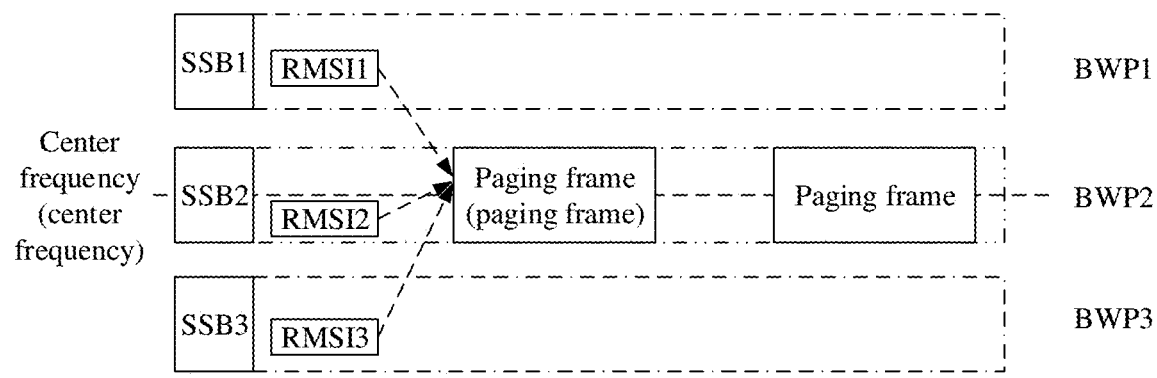
FIG. 19 is a schematic diagram of transmitting a paging message in a plurality of bandwidth parts BWPs according to an embodiment.

In an implementation, the network device may send a plurality of SSBs and a plurality of pieces of RMSI in a system bandwidth, and configure to send a paging message in one BWP. Referring to FIG. 19, the network device configures three SSBs (an SSB1, an SSB2, and an SSB3), and a bandwidth occupied by each SSB is a minimum system bandwidth supported by the terminal device. Each SSB has associated RMSI. The network device sends the SSB1 and RMSI1 associated with the SSB1 in a BWP1, sends the SSB2 and RMSI2 associated with the SSB2 in a BWP2, sends the SSB3 and RMSI3 associated with the SSB3 in a BWP3, and configures to transmit a paging message in the BWP2. When finding the SSB1, the terminal device obtains, based on RMSI indication information indicated in the SSB1, the BWP1 that carries the RMSI1 associated with the SSB1; finds the RMSI1; and finds, based on paging indication information indicated by the RMSI1, the BWP2 that carries the paging message, to read the paging message in the BWP2. Similarly, the terminal device may find, based on corresponding RMSI associated with the SSB2 or the SSB3, the BWP2 that carries the paging message.

The network device also sends paging to the terminal device, and the terminal device may obtain, based on frequency offset information, a BWP that is used to transmit a paging message. Specifically, an SSB and RMSI each include frequency offset information. The frequency offset information in the SSB is used to indicate an offset of a BWP carrying the RMSI relative to a BWP carrying the SSB, and the frequency offset information in the RMSI is used to indicate an offset of a BWP carrying the paging information relative to the BWP carrying the RMSI. Therefore, when the SSB is found, the terminal device may search, based on the frequency offset information indicated in the found SSB, for the BWP that carries the RMSI and that corresponds to the SSB; and find, based on the frequency offset information that is indicated in the RMSI and that is of a BWP used for sending the paging relative to the BWP of the RMSI, the BWP that carries the paging message (paging). Therefore, the paging message can be read in the BWP. The frequency offset information is described below as an example.

It can be understood that, in different implementations, the BWP for a user to send the paging message may be the same as or different from a center frequency channel number of the BWP that carries the RMSI.

Figure 20:
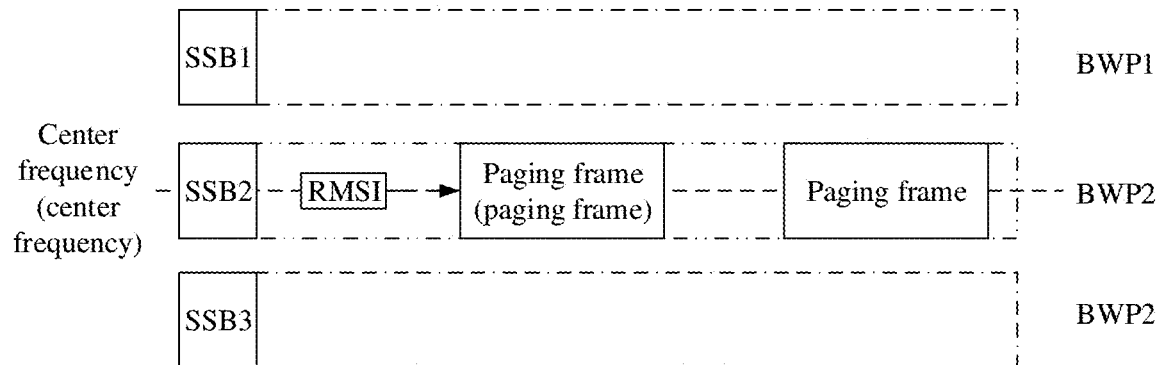
FIG. 20 is a schematic diagram of transmitting a paging message in a plurality of bandwidth parts BWPs according to still another embodiment.

In another embodiment, the network device configures one piece of RMSI in a system bandwidth, and sends a paging message in one BWP. When the network device configures a plurality of synchronization signal blocks and configures one piece of RMSI, the paging indication information is carried in the piece of RMSI for sending, each of the synchronization signal blocks includes RMSI indication information, and the RMSI indication information is used to indicate a location of the piece of RMSI to the terminal device. Referring to FIG. 20, the network device configures three SSBs (an SSB1, an SSB2, and an SSB3), and a bandwidth occupied by each SSB is a minimum system bandwidth supported by the terminal device. The piece of RMSI is associated with the SSB2. The network device may configure to transmit the RMSI in any BWP. In this embodiment, the network device transmits the RMSI in a BWP2. It can be understood that, the network device may alternatively configure to transmit the RMSI in a BWP1 or a BWP3 in another embodiment, and the network device may alternatively transmit the RMSI in another BWP in another implementation. This is not limited in this application. In addition, in FIG. 20, a center frequency channel number of a BWP used for sending the paging information may be the same as a center frequency channel number of the BWP that carries the RMSI. However, it can be understood that the center frequency channel number of the BWP used for sending the paging information may alternatively be different from the center frequency channel number of the BWP that carries the RMSI.

A PBCH in each SSB carries the RMSI indication information indicating the location of the piece of RMSI, to indicate the piece of RMSI. When finding an SSB, the terminal obtains, based on the RMSI indication information indicated in the SSB, a BWP that carries the associated RMSI; and then obtains, based on paging message indication information indicated in the RMSI, a BWP that carries the paging message. Optionally, when the PBCH in the SSB carries the paging information indication information, the terminal may obtain, based on the paging information indication information, the BWP that carries the paging message.

The RMSI indication information is indicated in the SSB. After finding an SSB, the terminal may find the RMSI based on the RMSI indication information that is of the RMSI and that is indicated by the SSB, without re-searching for the SSB and performing an SSB synchronization operation. This reduces complexity.

Figure 21:
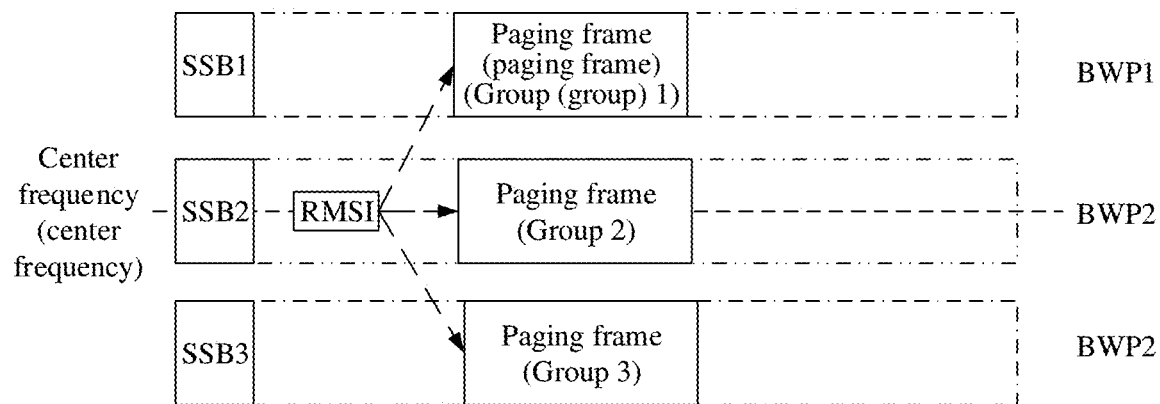
FIG. 21 is a schematic diagram of transmitting a paging message in a plurality of bandwidth parts BWPs according to still another embodiment.

In another embodiment, when the network device configures a plurality of synchronization signal blocks and one piece of RMSI, and one of the SSBs (referred to as a first SSB for short hereinafter) has associated RMSI, paging indication information is carried in the piece of RMSI for sending. The plurality of synchronization signal blocks include one first synchronization signal block that is associated with the first RMSI, the first synchronization signal block includes RMSI indication information, and the RMSI indication information is used to indicate a location of the RMSI to the terminal device. A synchronization signal block other than the first synchronization signal block in the plurality of synchronization signal blocks is a second synchronization signal block. The second synchronization signal block includes indication information of the first synchronization signal block, and the indication information of the first synchronization signal block is used to indicate a location of the first synchronization signal block relative to the second synchronization signal block. When the network device configures a plurality of SSBs, another second SSB other than the first SSB needs to carry the indication information of the first synchronization signal block. The indication information of the first synchronization signal block is used to indicate a frequency offset relative to the first SSB, so that the another SSB can obtain the location of the first SSB. An SSB1, an SSB2, and an SSB3 in FIG. 21 are used as an example. Assuming that the SSB2 is the first SSB, that is, the SSB2 has associated RMSI, the SSB1 and the SSB3 each carry SSB indication information of the SSB2. Therefore, when finding the SSB1, the terminal device may obtain the SSB2 based on the SSB indication information carried in the SSB1, and further obtain a location of the paging message based on the RMSI associated with the SSB2, to search for or receive the paging message at the corresponding location. The terminal device also performs similar operations when receiving the SSB3.

A location offset of an SSB including RMSI indication information is indicated in an SSB excluding the RMSI indication information. After finding an SSB, the UE may find, based on location offset information in the SSB, a BWP of the SSB that carries the RMSI indication information, and further find a location of a BWP used for sending a paging message. This reduces a quantity of times for performing blind detection on SSBs by the terminal device, and reduces complexity of the terminal device.

It should be understood that this embodiment is not limited to a scenario in which a BWP carrying RMSI is the same as a BWP carrying a default SSB. In other words, when the BWP carrying the RMSI is different from BWPs carrying SSBs, the network device may still configure an SSB as the default SSB, to perform implementation in the manner of this embodiment.

In still another embodiment, the network device configures to send paging messages in a plurality of BWPs, and the paging messages sent in the plurality of configured BWPs are not repeated. The terminal obtains, based on paging configuration information in RMSI, a BWP that is scheduled to send paging information, where the paging configuration information includes: a quantity Nn of activated BWPs that are on a carrier and that are used for sending a paging message, a number (paging channel index, PCHI) of a BWP used for sending the paging message, and/or paging indication information.

Specifically, the PCHI used for sending the paging message meets the following formula:

$$PCHI = \text{Floor}\left(\frac{UE\_ID}{N \times N_s}\right) \bmod N_n.$$

$$N_s = \max\left(\frac{1, nB}{T}\right),$$

and N=min(T,nB). nB and T are discontinuous reception (discontinuous reception, DRX) parameters. Specifically, T represents a DRX cycle (cycle). UE in an idle (idle) state listens to a paging message at an interval of T. nB represents a quantity of paging occasions (Paging Occasion, PO) in each DRX cycle. One PO indicates sending a paging message once. UE_ID may be a value obtained after a modulo operation is performed on a value of any one of the following plurality of identifiers by a fixed value: an international mobile equipment identity (international mobile equipment identity, IMEI), a temporary mobile subscriber identity (temporary mobile subscriber identity, TMSI), and a radio network temporary identifier (radio network temporary identifier, RNTI). A system sends, based on a grouped terminal, the paging message in a BWP corresponding to the terminal.

For example, the terminal device obtains through calculation, based on paging message configuration information in RMSI and a UE_ID, a number of a scheduled BWP used for sending a paging message, to obtain a frequency location of the BWP used for carrying the paging message. A terminal device 1 with a UE_ID being 722 and a terminal device 2 with a UE_ID being 739 are used as an example. If T=32, nB=T/2=16, N=min(T, nB)=16, and Ns=max(1, nB/T)=1, PCHI=FLOOR(722/16) MOD 3=0 of the terminal device 1 is obtained. The terminal device 2 searches for or receives a paging message in a BWP corresponding to a PCHI, to obtain PCHI=FLOOR(739/16) MOD 3=1 of the terminal device 2. The terminal device 2 searches for or receives a paging message in the BWP corresponding to the PCHI.

The network device configures a plurality of BWPs on a wideband carrier to send paging messages, and the network device groups users. Different user groups correspond to different BWPs, and the paging messages are not repeated in these BWPs, so that paging resources are saved.

The foregoing solution may be applied to a licensed (licensed) frequency band or an unlicensed (unlicensed) frequency band. This is not limited in this application. However, in the application scenario of the unlicensed frequency band, there are contention mechanisms of a plurality of different communications systems. The following further describes the application scenario of the unlicensed frequency band.

In the unlicensed frequency band, to ensure fairness, the network device or the terminal device needs to perform a listen before talk (LBT) operation before sending data.

In the application scenario of the unlicensed frequency band, an example in which a paging message is carried in a paging frame (paging frame, PF) is used for description. The paging frame may also be referred to as a paging message frame. The RMSI may further carry one or more of the following paging frame parameters: a first time offset value, a second time interval, and a paging of window (paging of window, POW). The first time offset value is an offset value of the paging frame relative to a start moment of a radio frame (radio frame, RF), and the first time offset value may be measured in a symbol, a slot (slot), or a mini-slot (mini slot). The value of the first time offset value may be zero, indicating that a corresponding paging frame is aligned with the start moment of the radio frame. For example, when the network device configures to send paging messages in a plurality of BWPs, the BWPs have different first time offset values P0, P1, and P2. The second time interval is a maximum time interval for continuously listening to a paging message when no paging message is obtained through listening in a corresponding BWP. The second time interval may also be measured in a symbol, a slot (slot), or a mini-slot (mini slot).

When the network device configures RMSI for each SSB, each piece of RMSI carries a paging frame parameter transmitted in a BWP in which a corresponding SSB is located. When the network device configures only one piece of RMSI for a plurality of SSBs, the piece of RMSI carries paging frame parameters transmitted in BWPs in which the plurality of corresponding SSBs are respectively located. In other words, the piece of RMSI carries a plurality of paging frame parameters.

Figure 22:
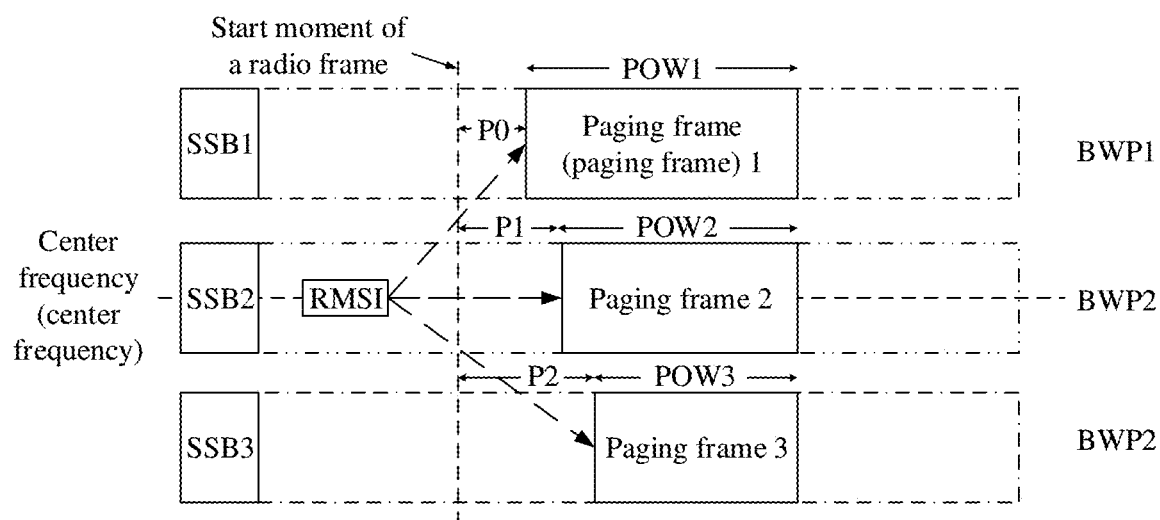
FIG. 22 is a schematic diagram of transmitting a paging message in a plurality of bandwidth parts BWPs according to an embodiment including an unlicensed spectrum band scenario.

Referring to FIG. 22, an example in which one piece of RMSI is corresponding to a plurality of SSBs is used for description below. The network device configures three SSBs: an SSB1, an SSB2, and an SSB3. A bandwidth occupied by each SSB is a minimum bandwidth supported by the terminal device. The three SSBs are respectively transmitted in a plurality of BWPs (a BWP1, a BWP2, and a BWP3), and the plurality of BWPs further transmit paging messages. In this case, the piece of RMSI carries paging frame parameters respectively transmitted in the BWP1, the BWP2, and the BWP3. A POW1 represents a length of a paging frame 1, a POW2 represents a length of a paging frame 2, and a POW3 represents a length of a paging frame 3.

As shown in the figure, a first time offset value of the paging frame 1 is P0, that is, an offset value relative to a start moment of a radio frame is P0; a first time offset value of the paging frame 2 is P1, that is, an offset value relative to the start moment of the radio frame is P1; and a first time offset value of the paging frame 3 is P2, that is, an offset value relative to the start moment of the radio frame is P2, where P0<P1<P2.

The terminal device listens to a paging message in the BWP1 based on received RMSI. If obtaining no paging message through listening within the second time interval (for example, a difference between P1 and P2), the terminal device jumps to the BWP2 to listen to a paging message. If the terminal device obtains a paging message through listening within the second time interval, but finds no paging message of the terminal device in the paging message obtained through listening, that is, a paging message list includes no UE_ID of the terminal device, the terminal device continues to perform listening until the POW1 times out. If the terminal device obtains a paging message through listening within the second time interval, and finds a paging message of the terminal device, the terminal device receives the paging message.

It is configured to send, in a plurality of BWPs, paging message frames with different offset duration relative to a radio frame, to avoid a case in which, due to uncertainty of an LBT result, a paging message cannot be sent in a BWP that is unsuccessfully obtained through listening, and consequently a terminal device camping on the BWP cannot receive the paging message. Therefore, this can increase a probability for obtaining a paging message through listening in an unlicensed frequency band by the terminal device, and improve communication efficiency.

For example, in the foregoing embodiments, the paging indication information, the RMSI indication information, and the SSB indication information may be included or indication may be performed by using a frequency offset. The following provides example descriptions of the frequency offset case. The frequency offset information is used to indicate frequency location information of a BWP.

When there is a default bandwidth for both the network device and the terminal, the frequency offset information may be: (1) an offset of a predetermined frequency channel number of a BWP carrying paging information relative to a start frequency channel number of a BWP carrying an SSB or relative to a start frequency channel number of a BWP carrying RMSI; (2) an offset of a predetermined frequency channel number of a BWP carrying paging information relative to an end frequency channel number of a BWP carrying an SSB or relative to an end frequency channel number of a BWP carrying RMSI; or (3) an offset of a predetermined frequency channel number of a BWP carrying paging information relative to a center frequency channel number of a BWP carrying an SSB or relative to a center frequency channel number of a BWP carrying RMSI. The predetermined frequency channel number of the BWP carrying the paging information may be a start frequency channel number, an end frequency channel number, or a center frequency channel number.

When there is no default bandwidth for the network device and the terminal, the frequency offset information may be: (1) an offset of a start frequency channel number of a BWP carrying paging information relative to a start frequency channel number of a BWP carrying an SSB or relative to a start frequency channel number of a BWP carrying RMSI, and an offset of an end frequency channel number of a BWP carrying paging information relative to a start frequency channel number of a BWP carrying an SSB or relative to a start frequency channel number of a BWP carrying RMSI; (2) an offset of a start frequency channel number of a BWP carrying paging information relative to an end frequency channel number of a BWP carrying an SSB or relative to an end frequency channel number of a BWP carrying RMSI, and an offset of an end frequency channel number of a BWP carrying paging information relative to an end frequency channel number of a BWP carrying an SSB or relative to an end frequency channel number of a BWP carrying RMSI; or (3) an offset of a start frequency channel number of a BWP carrying paging information relative to a center frequency channel number of a BWP carrying an SSB or relative to a start frequency channel number of a BWP carrying RMSI, and an offset of an end frequency channel number of a BWP carrying paging information relative to a center frequency channel number of a BWP carrying an SSB or relative to a start frequency channel number of a BWP carrying RMSI.

For the frequency offset information, if there is no agreed width of a default bandwidth, the frequency offset information may alternatively be a width of a bandwidth and an offset of a start frequency channel number, an end frequency channel number, or a center frequency channel number of an indicated BWP relative to a start frequency channel number of a BWP carrying an SSB or relative to a BWP carrying RMSI.

Optionally, the frequency offset information may be a width of a bandwidth and an offset of a start frequency channel number, an end frequency channel number, or a center frequency channel number of an indicated BWP relative to an end frequency channel number of a BWP carrying an SSB or relative to a BWP carrying RMSI.

Further, optionally, the frequency offset information may be a width of a bandwidth and an offset of a start frequency channel number, an end frequency channel number, or a center frequency channel number of an indicated BWP relative to a center frequency channel number of a BWP carrying an SSB or relative to a BWP carrying RMSI.

A unit of the frequency channel number and the bandwidth may be Hz, KHz, MHz, or the like. An indication granularity of the offset may be a carrier spacing, an RB, or an RB group (RB group, for example, 10 RBs).

The foregoing describes the implementations of the configured paging message transmission method in detail in this application. The following continues to describe implementations of the network device and the terminal device in this application.

An implementation of the network device is first described. In a specific example, a structure of the network device includes a processor (or referred to as a controller) and a transceiver. In a possible example, the structure of the network device may further include a communications unit. The communications unit is configured to support communication with another network side device, such as communication with a core network node. In a possible example, the structure of the network device may further include a memory. The memory is coupled to the processor, and is configured to store a program instruction and data that are necessary for the network device.

Figure 23:
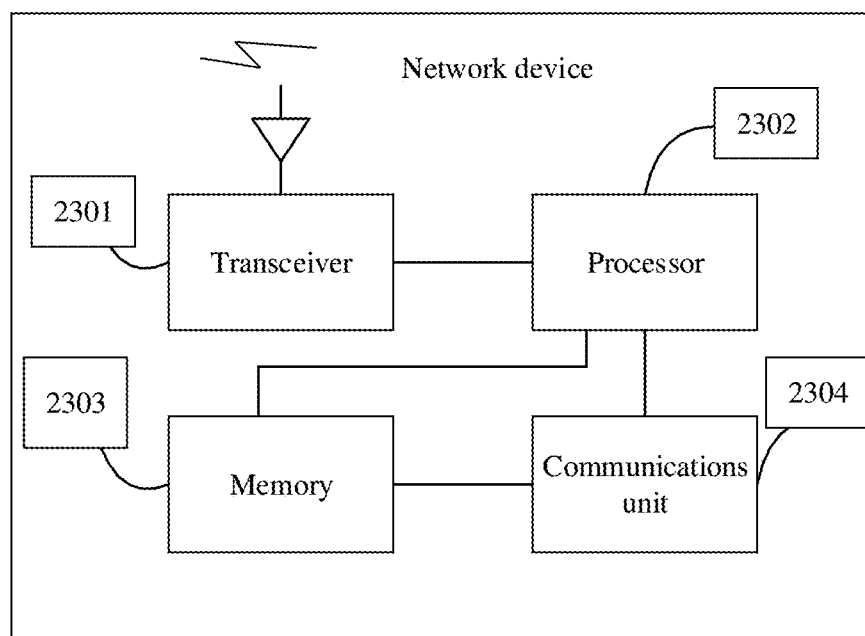
FIG. 23 is a simplified schematic structural diagram of a network device according to an embodiment of this application.

FIG. 23 is a possible simplified schematic structural diagram of the network device in the foregoing implementation. In an example corresponding to FIG. 23, a structure of the network device in this application includes a transceiver 2301, a processor 2302, a memory 2303, and a communications unit 2304. The transceiver 2301, the processor 2302, the memory 2303, and the communications unit 2304 are connected by using a bus.

On a downlink, to-be-sent data or signaling (including the foregoing downlink control information) is adjusted by the transceiver 2301 to provide output sampling and generate a downlink signal. The downlink signal is transmitted to the terminal device in the foregoing embodiment by using an antenna. On an uplink, an antenna receives an uplink signal (including the foregoing random access preamble) transmitted by the terminal device in the foregoing embodiment. The transceiver 2301 adjusts the signal received from the antenna, and provides input sampling. The processor 2302 processes service data and a signaling message, for example, modulating to-be-sent data and generating an SC-FDMA symbol. These units perform processing based on a radio access technology (for example, an access technology in LTE, 5G, and another evolved system) used by a radio access network. In the implementation shown in FIG. 23, the transceiver 2301 is integrated by a transmitter and a receiver. In another implementation, the transmitter and the receiver may alternatively be independent of each other.

The processor 2302 is further configured to control and manage actions of the network device, to perform processing performed by the network device in the foregoing embodiments, for example, configured to control the network device to process an SSB and RMSI and/or perform another process of the technology described in this application. In an example, the processor 2302 is configured to support the network device in performing the processing processes related to the network device in FIG. 2 to FIG. 6. When being applied to an unlicensed scenario, the processor 2302 performs channel listening and obtains a channel occupancy time through contention. For example, the processor 2302 performs channel listening based on a signal received by the transceiver 2302 from the antenna, and controls the transceiver to send a signal from the antenna to occupy a channel. In different implementations, the processor 2302 may include one or more processors, for example, include one or more central processing units (CPU). The processor 2302 may be integrated into a chip, or may be a chip.

The memory 2303 is configured to store a related instruction and related data, and program code and data of the network device. In different implementations, the memory 2303 includes but is not limited to a random access memory (RAM), a read-only memory (ROM), an erasable programmable read-only memory (EPROM), or a portable read-only memory (CD-ROM).

It can be understood that FIG. 23 shows merely a simplified design of the network device. In an actual application, the network device may include any quantity of transmitters, receivers, processors, memories, and the like. All network devices that can implement this application fall within the protection scope of this application.

The following describes an implementation of the terminal device. In a specific example, a structure of the terminal device includes a processor (or referred to as a controller), a transceiver, and a modem processor. In a possible example, the structure of the network device may further include a memory. The memory is coupled to the processor, and is configured to store a program instruction and data that are necessary for the network device.

Figure 24:
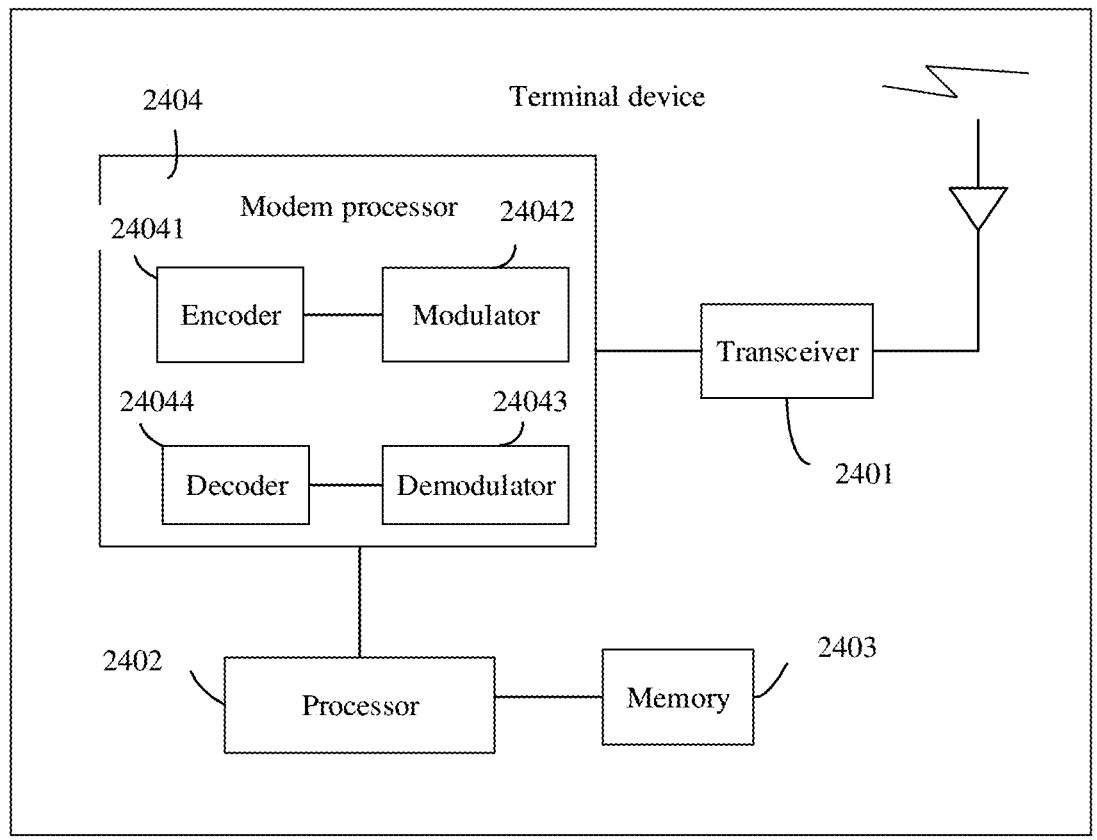
FIG. 24 is a simplified schematic structural diagram of a terminal device according to an embodiment of this application.
Figure 25:
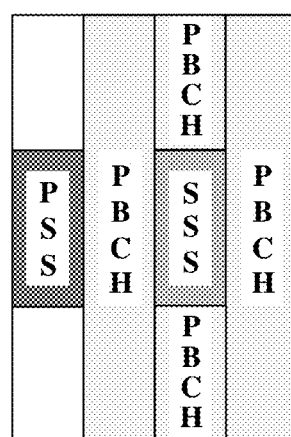
FIG. 25 is a schematic diagram of a possible structure of a synchronization signal block.

FIG. 24 is a simplified schematic diagram of a possible design structure of the terminal device in the foregoing embodiment. The terminal device includes a transceiver 2401, a processor 2402, a memory 2403, and a modem processor 2404. The transceiver 2401, the processor 2402, the memory 2403, and the modem processor 2404 are connected by using a bus.

The transceiver 2401 adjusts (for example, performs analog-to-digital conversion, filtering, amplification, and up-conversion on) output sampling and generates an uplink signal. The uplink signal is transmitted to the network device in the foregoing embodiment by using an antenna. On a downlink, an antenna receives a downlink signal transmitted by the base station in the foregoing embodiment. The transceiver 2401 adjusts (for example, performs filtering, amplification, down-conversion, and digitization on) the signal received from the antenna and provides input sampling. For example, in the modem processor 2404, an encoder 24041 receives service data and a signaling message that are to be sent on an uplink, and processes (for example, formats, encodes, and interleaves) the service data and the signaling message. A modulator 24042 further processes (for example, performs symbol mapping and modulation on) service data obtained after the encoding and a signaling message obtained after the encoding, and provides output sampling. A demodulator 24043 processes (for example, demodulates) the input sampling and provides symbol estimation. A decoder 24044 processes (for example, de-interleaves and decodes) the symbol estimation and provides data obtained after the decoding and a signaling message obtained after the decoding that are to be sent to the terminal device. The encoder 24041, the modulator 24042, the demodulator 24043, and the decoder 24044 may be implemented by the integrated modem processor 2404. These units perform processing based on a radio access technology (for example, an access technology in LTE, 5G, and another evolved system) used by a radio access network. In the implementation shown in FIG. 24, the transceiver 2401 is integrated by a transmitter and a receiver. In another implementation, the transmitter and the receiver may alternatively be independent of each other.

The processor 2402 controls and manages actions of the terminal device, and is configured to perform processing performed by the terminal device in the foregoing embodiment. For example, the processor 2402 is configured to control the terminal device to perform processing based on received paging indication information and/or perform another process of the technology described in the present invention. In an example, the processor 2402 is configured to support the terminal device in performing the processing processes related to the terminal device in FIG. 2 to FIG. 6. For example, the transceiver 2401 is configured to receive, by using the antenna, downlink control information sent by the network device, and the processor 2402 is configured to control, based on the downlink control information, the transceiver to send or not to send a random access preamble by using the antenna. In different implementations, the processor 2402 may include one or more processors, for example, include one or more CPUs. The processor 2402 may be integrated into a chip, or may be a chip.

The memory 2403 is configured to store a related instruction and related data, and program code and data of the terminal device. In different implementations, the memory 2403 includes but is not limited to a random access memory (Random Access Memory, RAM), a read-only memory (Read-Only Memory, ROM), an erasable programmable read-only memory (Erasable Programmable Read Only Memory, EPROM), or a portable read-only memory (Compact Disc Read-Only Memory, CD-ROM).

It can be understood that FIG. 24 shows merely a simplified design of the terminal device. In an actual application, the terminal device may include any quantity of transmitters, receivers, processors, memories, and the like, and all terminal devices that can implement this application fall within the protection scope of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It should be understood that, in the embodiments of the present invention, the terms "first", "second", and the like are merely intended to indicate an object, and do not indicate a sequence of corresponding objects.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or partially contribute to the current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various mediums that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, a first indication information and a third indication information in a first synchronization signal block carried on a physical broadcast channel, wherein the third indication information indicates that the first synchronization signal block is not associated with control information, the first indication information indicating a resource location of a second synchronization signal block, and the second synchronization signal block being associated with the control information; and
   receiving, by the terminal device, the second synchronization signal block.

2. The method according to claim 1, wherein:
   the control information is carried on a same time domain resource as the second synchronization signal block; or
   the control information is carried on a time domain resource subsequent to the second synchronization signal block in a protocol-specified manner or a predefined manner.

3. The method according to claim 1, wherein:
   resource configuration information of the control information associated with the terminal device is indicated by a physical broadcast channel in the second synchronization signal block.

4. The method according to claim 1, wherein:
   the resource location of the second synchronization signal block comprises an absolute location of the second synchronization signal block in a bandwidth;
   the resource location of the second synchronization signal block comprises a relative location of the second synchronization signal block relative to a first intra-frequency signal block; or
   the resource location of the second synchronization signal block comprises a resource location of the first synchronization signal block relative to the second synchronization signal block.

5. The method according to claim 1, wherein:
   the first indication information indicates a value of a frequency domain offset between the second synchronization signal block and the first synchronization signal block.

6. The method according to claim 1, wherein:
   the physical broadcast channel comprises a first field, a second field and third field;
   the first field is valid in response to the first synchronization signal block being associated with the control information;
   the second field is valid in response to the first synchronization signal block not being associated with the control information, and the second field carries the first indication information;
   the third field is valid in response to the first synchronization signal block being associated with or in response to the first synchronization signal block not being associated with the control information; and
   bits occupied by the first field and the second field on the physical broadcast channel overlap.

7. A method, comprising:
   sending, by a network device, a first synchronization signal block, wherein in response to the first synchronization signal block not being associated with control information, the first synchronization signal block carries first indication information and a third indication information on a physical broadcast channel, the third indication information indicates that the first synchronization signal block is not associated with the control information, the first indication information indicating a resource location of a second synchronization signal block, and the second synchronization signal block being associated with the control information; and sending, by the network device, the second synchronization signal block to a terminal device.

8. The method according to claim 7, wherein:
the control information is carried a same time domain resource as the second synchronization signal block; or
the control information is carried on a time domain resource subsequent to the second synchronization signal block in a protocol-specified manner or a predefined manner.

9. The method according to claim 7, wherein:
resource configuration information of the control information associated with the terminal device is indicated by a physical broadcast channel in the second synchronization signal block.

10. The method according to claim 7, wherein:
the resource location of the second synchronization signal block comprises an absolute location of the second synchronization signal block in a bandwidth;
the resource location of the second synchronization signal block comprises a relative location of the second synchronization signal block relative to a first intra-frequency signal block; or
the resource location of the second synchronization signal block comprises a resource location of the first synchronization signal block relative to the second synchronization signal block.

11. The method according to claim 7, wherein:
the first indication information indicates a value of a frequency domain offset between the second synchronization signal block and the first synchronization signal block.

12. The method according to claim 7, wherein:
the physical broadcast channel comprises a first field, a second field and third field;
the first field is valid in response to the first synchronization signal block being associated with the control information;
the second field is valid in response to the first synchronization signal block not being associated with the control information, and the second field carries the first indication information;
the third field is valid in response to the first synchronization signal block being associated with or in response to the first synchronization signal block not being associated with the control information; and
bits occupied by the first field and the second field on the physical broadcast channel overlap.

13. A device, comprising:
a receiver; and
a processor, wherein the processor is configured to control the receiver to perform:
 receiving first indication information and a third indication information in a first synchronization signal block carried on a physical broadcast channel, wherein the third indication information indicates that the first synchronization signal block is not associated with control information, the first indication information indicating a resource location of a second synchronization signal block, and the second synchronization signal block being associated with the control information; and
 receiving the second synchronization signal block.

14. The device according to claim 13, wherein:
the control information is carried on a same time domain resource as the second synchronization signal block; or
the control information is carried on a time domain resource subsequent to the second synchronization signal block in a protocol-specified manner or a predefined manner.

15. The device according to claim 13, wherein:
resource configuration information of the control information associated with the device is indicated by a physical broadcast channel in the second synchronization signal block.

16. The device according to claim 13, wherein:
the resource location of the second synchronization signal block comprises an absolute location of the second synchronization signal block in a bandwidth;
the resource location of the second synchronization signal block comprises a relative location of the second synchronization signal block relative to a first intra-frequency signal block; or
the resource location of the second synchronization signal block comprises a resource location of the first synchronization signal block relative to the second synchronization signal block.

17. The device according to claim 13, wherein:
the first indication information indicates a value of a frequency domain offset between the second synchronization signal block and the first synchronization signal block.

18. The device according to claim 13, wherein:
the physical broadcast channel comprises a first field, a second field and third field,
the first field is valid in response to the first synchronization signal block being associated with the control information;
the second field is valid in response to the first synchronization signal block not being associated with the control information, and the second field carries the first indication information;
the third field is valid in response to the first synchronization signal block being associated with or in response to the first synchronization signal block not being associated with the control information; and
bits occupied by the first field and the second field on the physical broadcast channel overlap.

19. A device, comprising:
a transmitter; and
a processor, wherein the processor is configured to control the transmitter to perform:
 sending a first synchronization signal block, wherein in response to the first synchronization signal block not being associated with control information, the first synchronization signal block carries first indication information and a third indication information on a physical broadcast channel, the third indication information indicates that the first synchronization signal block is not associated with the control information, the first indication information indicating a resource location of a second synchronization signal block, and the second synchronization signal block being associated with the control information; and
 sending the second synchronization signal block to a terminal device.

20. The device according to claim 19, wherein:
the control information is carried on a same time domain resource as the second synchronization signal block; or
the control information is carried on a time domain resource subsequent to the second synchronization signal block in a protocol-specified manner or a predefined manner.

21. The device according to claim 19, wherein:
resource configuration information of the control information associated with the terminal device is indicated by a physical broadcast channel in the second synchronization signal block.

22. The device according to claim 19, wherein:
the resource location of the second synchronization signal block comprises an absolute location of the second synchronization signal block in a bandwidth;
the resource location of the second synchronization signal block comprises a relative location of the second synchronization signal block relative to a first intra-frequency signal block; or
the resource location of the second synchronization signal block comprises a resource location of the first synchronization signal block relative to the second synchronization signal block.

23. The device according to claim 19, wherein:
the first indication information indicates a value of a frequency domain offset between the second synchronization signal block and the first synchronization signal block.

24. The device according to claim 19, wherein:
the physical broadcast channel comprises a first field, a second field and third field;
the first field is valid in response to the first synchronization signal block being associated with the control information;
the second field is valid in response to the first synchronization signal block not being associated with the control information, and the second field carries the first indication information;
the third field is valid in response to the first synchronization signal block being associated with or in response to the first synchronization signal block not being associated with the control information; and
bits occupied by the first field and the second field on the physical broadcast channel overlap.

* * * * *